United States Patent
Arimitsu

(10) Patent No.: US 12,110,360 B2
(45) Date of Patent: Oct. 8, 2024

(54) CURABLE COMPOSITION, CURED PRODUCT, AND METHOD OF PRODUCING CURED PRODUCT

(71) Applicant: Tokyo University of Science Foundation, Tokyo (JP)

(72) Inventor: Koji Arimitsu, Tokyo (JP)

(73) Assignee: Tokyo University of Science Foundation, Tokyo (JP)

( * ) Notice: Subject to any disclaimer, the term of this patent is extended or adjusted under 35 U.S.C. 154(b) by 729 days.

(21) Appl. No.: 17/270,974

(22) PCT Filed: Aug. 27, 2019

(86) PCT No.: PCT/JP2019/033585
§ 371 (c)(1),
(2) Date: Apr. 6, 2021

(87) PCT Pub. No.: WO2020/045458
PCT Pub. Date: Mar. 5, 2020

(65) Prior Publication Data
US 2023/0212345 A1    Jul. 6, 2023

(30) Foreign Application Priority Data

Aug. 28, 2018    (JP) .................... 2018-159767

(51) Int. Cl.
| | | |
|---|---|---|
| C08G 18/16 | (2006.01) | |
| C08G 18/18 | (2006.01) | |
| C08G 18/20 | (2006.01) | |
| C08G 18/32 | (2006.01) | |
| C08G 18/58 | (2006.01) | |
| C08G 18/76 | (2006.01) | |
| C08J 5/18 | (2006.01) | |

(52) U.S. Cl.
CPC ....... *C08G 18/161* (2013.01); *C08G 18/1841* (2013.01); *C08G 18/2072* (2013.01); *C08G 18/2081* (2013.01); *C08G 18/3206* (2013.01); *C08G 18/581* (2013.01); *C08G 18/584* (2013.01); *C08G 18/7642* (2013.01); *C08J 5/18* (2013.01); *C08J 2375/04* (2013.01)

(58) Field of Classification Search
CPC .............. C08G 18/161; C08G 18/1841; C08G 18/2072; C08G 18/2081; C08G 18/3206
USPC ....................................................... 428/220
See application file for complete search history.

(56) References Cited

U.S. PATENT DOCUMENTS

2017/0293225 A1    10/2017  Arimitsu et al.

FOREIGN PATENT DOCUMENTS

| | | |
|---|---|---|
| CN | 106796394 A | 5/2017 |
| EP | 3315529 A1 | 5/2018 |

(Continued)

OTHER PUBLICATIONS

Alsarraf, et al.; Cyclic Guanidines as Efficient Organocatalysts for the Synthesis of Polyurethanes; Feb. 21, 2012; ACS Publications; 45; 2249-2256 (Year: 2023).*

(Continued)

*Primary Examiner* — Tahseen Khan
(74) *Attorney, Agent, or Firm* — Banner & Witcoff, Ltd.

(57) ABSTRACT

One embodiment of the present invention provides a curable composition, including a polyfunctional isocyanate compound, a compound selected from the group consisting of a multivalent alcohol and an epoxy compound, and a base amplifier.

10 Claims, 3 Drawing Sheets

(56) References Cited

FOREIGN PATENT DOCUMENTS

| | | | |
|---|---|---|---|
| JP | 2000330270 A | * | 11/2000 |
| JP | 2001-513765 A | | 9/2001 |
| JP | 2013-76000 A | | 4/2013 |
| JP | 2016-050303 A | | 4/2016 |
| JP | 2017-155204 A | | 9/2017 |
| WO | 2010/064631 A1 | | 6/2010 |
| WO | 2010/064632 A1 | | 6/2010 |
| WO | 2018077862 A1 | | 5/2018 |

OTHER PUBLICATIONS

Machine_English_translation_JP_2000330270_A; Arimitsu, et al.; Base Propagator, Base Propagator Composition, Reactive Base Composition and Pattern Forming Method; Nov. 30, 2000; EPO; whole document (Year: 2024).*

Apr. 24, 2022 (CN) Office Action App. No. 201980065830.3.

Arimitsu et al. "Application to Photoreactive Materials of Photochemical Generation of Superbases with High Efficiency Based on Photodecarboxylation Reactions" Chem.Mater.2013, 25, 4461-4463.

Cameron et al "Photogeneration of Organics Bases from o-Nitrobenzyl-Derived Carbamates" J.Am.Chem.Soc. 1991, 113, 4303-4313.

Shirai et al "Photoacid and Photobase Generatos: Chemistry and Applications to Polymeric Materials" Prog.Polym.Sci. 1996, 21, 1.

Sep. 14, 2021 (EP) Extended European Search Report, Application No. 19854227.6.

Alsarraf et al., "Cyclic Guanideines as Efficient Organocatalysts for the Synthesis of Polyurethanes", Macromolecules, vol. 45, No. 5, Feb. 21, 2012, pp. 2249 2256.

May 16, 2023 (JP) Office Action Japanese Application No. 2020-539519.

* cited by examiner

| | Example 1 ||
|---|---|---|
| Base amplifier CCA2 | Y ||
| Irradiation by light | Y | N |
| Glass tube test sample 1 |  Cured |  Not cured |
| Glass substrate test sample 2 |  Cured |  Not cured |

| | Comparative Example 1 | |
|---|---|---|
| Base amplifier CCA2 | N | |
| Irradiation by light | Y | N |
| Glass tube test sample 1 |  Not cured |  Not cured |

CURABLE COMPOSITION, CURED PRODUCT, AND METHOD OF PRODUCING CURED PRODUCT

RELATED APPLICATIONS

This application is a National Stage Application under 35 U.S.C. 371 of co-pending PCT application number PCT/JP2019/033585 designating the United States and filed Aug. 27, 2019; which claims the benefit of JP application number 2018-159767 and filed Aug. 28, 2018 each of which are hereby incorporated by reference in their entireties.

TECHNICAL FIELD

The present disclosure relates to a curable composition, a cured product, and a method of producing the cured product.

BACKGROUND ART

Curable compositions that are cured by applying active energy rays such as light or radiation or energy such as heat have been widely used for curable inks, printing plates, photoresists, curable adhesives, and the like. Among curable compositions, a composition containing a photopolymerization initiator that releases an active species by applying energy is known as a composition that allows polymerization curing by active energy rays, and developing process.

Photopolymerization initiators are classified into radical generators, acid generators, and base generators in terms of difference in active species that are generated in response to irradiation by active energy rays.

Radical generators that release radical species are used in the case of configuring a radical polymerization system that generates radical species in compositions to act on monomers containing unsaturated double bonds or the like, to promote addition polymerization. Radical generators have advantages such as high curing rate in compositions and no radical species remaining after curing, but they are susceptible to polymerization inhibition by oxygen. Therefore, in curing of films, there is a drawback that, for example, it is indispensable to take measures such as lowering oxygen concentration in the atmosphere, or providing a layer that blocks oxygen or the like.

Acid generators that release acids are used in the case of configuring a cationic polymerization system that generates acids in compositions to act on monomers or the like, to promote polymerization reaction. Unlike radical generators, acid generators have advantage of being less susceptible to polymerization inhibition by oxygen but, since the active species are acids, there is a drawback that it is not possible to apply them to materials or moieties that use metals due to concerns about corrosion or denaturation of resins by acids.

Base generators that release bases are used in the case of configuring an anionic polymerization system that generates bases in compositions to act on monomers or the like, to promote polymerization reaction. Unlike the radical generators or acid generators described above, base generators are unlikely to cause a situation such as polymerization inhibition by oxygen, or corrosion or denaturation of resins due to acids that serve as active species remaining in the system. Therefore, a polymerization system using base generators has drawn attention. Examples of base generators include those disclosed in Japanese Patent Application Laid-Open (JP-A) No. 2001-513765, International Publication No. 2010/064631, and International Publication No. 2010/064632.

In addition to the above, ionic base generators that are salts of guanidine or guanidine-type strong bases with carboxylic acids and that release guanidine-type strong bases by applying energy (see, for example, K. Arimitsu, R. Endo, Chem. Mater. 2013, 25, 4461-4463.), and nonionic base generators that release primary amines or secondary amines (see, K. Arimitsu, R. Endo, Chem. Mater. 2013, 25, 4461-4463; J. F. Cameron, J. M. J. Frechet, J. Am. Chem. Soc. 1991, 113, 4303; M. Shirai, M. Tsunooka, Prog. Polym. Sci. 1996, 21, 1.) are known.

Technical Problem

However, base generators have the problem that sensitivity at the time of curing (that is, curability) is generally lower than that of acid generators. Although base generators have advantages that differ from those of radical generators or acid generators as described above, if the sensitivity is low, there are the problems of a likely difficulty of application to a thick film and poor practical utility, even they can be used for curing a thin film.

Further, curable compositions are expected to be used for reinforcing materials, molding materials, and the like, which are represented by structural materials such as concrete and are particularly required to show favorable curability even when made into a thick film having a thickness of from several millimeters to several tens of millimeters.

The present disclosure has been made in view of the above.

A problem to be solved by one embodiment of the present invention is to provide a curable composition of anionic polymerization system that avoids drawbacks in radical polymerization or cationic polymerization and that is excellent in curing sensitivity.

Further, a problem to be solved by another embodiment of the present invention is to provide a cured product that is favorably cured.

Furthermore, a problem to be solved by another embodiment of the present invention is to provide a method of producing a cured product that allows a urethane bond formation reaction with favorable sensitivity, while avoiding drawbacks in radical polymerization or cationic polymerization.

Solution to Problem

Specific means for solving the problem include the following aspects.

<1> A curable composition, comprising: a polyfunctional isocyanate compound; a compound selected from the group consisting of a multivalent alcohol and an epoxy compound; and a base amplifier.

<2> The curable composition according to <1>, wherein the base amplifier comprises a compound represented by the following General Formula (1):

wherein, in the formula, G represents an organic group; and X is a group represented by the following General Formula (1)-11, General Formula (1)-12, General Formula (1)-13, or General Formula (1)-14:

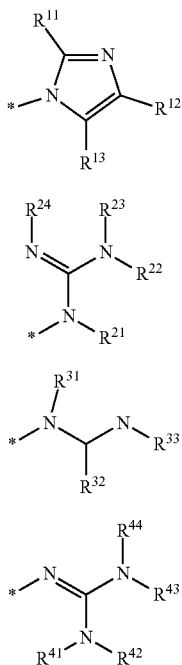

(1)-11

(1)-12

(1)-13

(1)-14 wherein, in the formulae, each of $R^{11}$, $R^{12}$, $R^{13}$, $R^{21}$, $R^{22}$, $R^{23}$, $R^{24}$, $R^{31}$, $R^{32}$, $R^{33}$, $R^{41}$, $R^{42}$, $R^{43}$ and $R^{44}$ independently represents a hydrogen atom or a hydrocarbon group; when two or more of $R^{11}$, $R^{12}$, or $R^{13}$ are hydrocarbon groups, the two or more hydrocarbon groups may be bonded to each other to form a ring; when two or more of $R^{21}$, $R^{22}$, $R^{23}$, or $R^{24}$ are hydrocarbon groups, the two or more hydrocarbon groups may be bonded to each other to form a ring; when two or more of $R^{31}$, $R^{32}$, or $R^{33}$ are hydrocarbon groups, the two or more hydrocarbon groups may be bonded to each other to form a ring; when two or more of $R^{41}$, $R^{42}$, $R^{43}$ or $R^{44}$ are hydrocarbon groups, the two or more hydrocarbon groups may be bonded to each other to form a ring; and * represents a site that is bonded to a carbon atom.

<3> The curable composition according to <2>, wherein the compound represented by General Formula (1) comprises at least one compound selected from the group consisting of a compound represented by the following General Formula (1)-A and a compound represented by the following General Formula (1)-B:

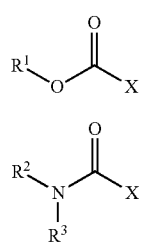

(1)-A (1)-B wherein, in the formulae, $R^1$ represents an organic group; each of $R^2$ and $R^3$ independently represents a hydrogen atom or an organic group; each X independently represents the group represented by General Formula (1)-11, General Formula (1)-12, General Formula (1)-13, or General Formula (1)-14; at least one of $R^2$ or $R^3$ represents an organic group; and when $R^2$ and $R^3$ are both organic groups, they may be bonded to each other to form a ring.

<4> The curable composition according to any one of <1> to <3>, further comprising a base generator.

<5> The curable composition according to <4>, wherein the base generator is a compound that generates a base in response to irradiation by light or heating.

<6> A cured product obtained by curing the curable composition according to any one of <1> to <5>.

<7> The cured product according to <6>, having a thickness of $1 \times 10^{-3}$ m or more.

<8> A method of producing a cured product, the method comprising: forming a urethane bond using, as a catalyst, a base that is generated by applying energy to the curable composition according to any one of <1> to <5>.

<9> A method of producing a cured product, the method comprising:
applying energy to the curable composition according to <4> or <5>, to generate a base from the base generator and to generate a base from the base amplifier;
wherein a part of the generated base activates a hydroxyl group of the multivalent alcohol or an epoxy group of the epoxy compound, to promote generation of a base from the base amplifier, and another part of the generated base, as a catalyst, initiates or promotes a urethane bond formation reaction of the polyvalent isocyanate compound and the multivalent alcohol, to produce a polyurethane that is a reacted cured product.

<10> The method of producing a cured product according to <8> or <9>, wherein the application of energy is at least one of irradiation by light or heating.

<11> The method of producing a cured product according to any one of <8> to <10>, wherein the curable composition is a film having a thickness of $1 \times 10^{-3}$ or more.

Advantageous Effects of Invention

According to one embodiment of the present invention, a curable composition of anionic polymerization system that avoids drawbacks in radical polymerization or cationic polymerization and that is excellent in curing sensitivity can be provided.

According to another embodiment of the present invention, a cured product that is favorably cured can be provided.

According to another embodiment of the present invention, a method of producing a cured product that allows a urethane bond formation reaction with favorable sensitivity, while avoiding drawbacks in radical polymerization or cationic polymerization can be provided.

DESCRIPTION OF EMBODIMENTS

Figure 1:
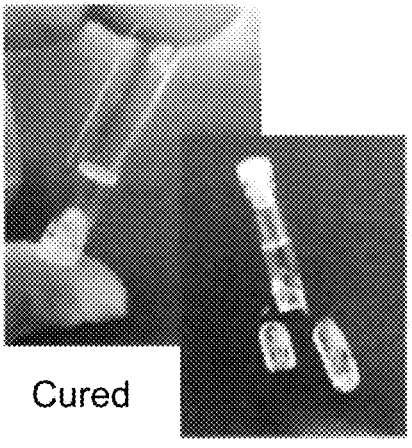
FIG. 1 is an image showing a result of the evaluation test of curability of Example 1.
Figure 1:
Figure 1:
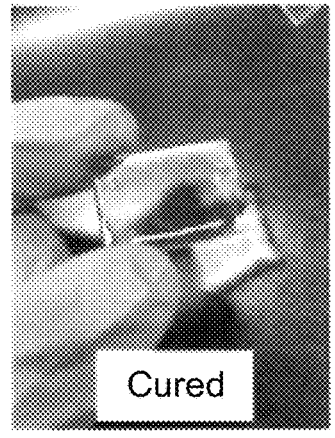
Figure 1:

Hereinafter, the curable composition, the cured product, and the production method thereof of the present disclosure will be specifically described.

The expression "(from) X to Y" described herein indicates a range including the numerical values described before and after "to" as the minimum and maximum values, respectively. In the numerical range described stepwise in the present disclosure, the upper limit value or the lower limit value described in a numerical range may be replaced with the upper limit value or the lower limit value of another numerical range described stepwise. Further, in the numerical range described in the present disclosure, the upper limit value or the lower limit value described in a numerical range may be replaced with the value indicated in the examples.

Herein, the amount of each component in the composition means, when multiple substances corresponding to each component are present in the composition, the total amount of the multiple substances that are present in the composition, unless otherwise specified.

Herein, the term "step" includes not only an independent step, but also a step that is not clearly distinguished from another step but that achieves the intended purpose of the step.

<Curable Composition>

The curable composition of the present disclosure includes a polyfunctional isocyanate compound, a compound selected from the group consisting of a multivalent alcohol and an epoxy compound, and a base amplifier, and preferably further includes a base generator. The curable composition of the present disclosure may further include other components such as colorants or additives, as needed.

Conventionally, radical generators that are used for curable compositions of radical polymerization system have a drawback of being susceptible to polymerization inhibition by oxygen, and acid generators that are used for cationic polymerization system have a drawback of being not possible to apply them to materials or moieties that use metals due to concerns about corrosion of metals or the like or denaturation of resins by acids that serve as active species.

On the other hand, since base generators do not have the drawbacks of radical generators or acid generators, they are expected to be applied to the fields in which radical generators or acid generators have been conventionally used. However, base generators have a drawback that sensitivity is sometimes low to fail satisfactory curability. If sensitivity at the time of curing (curability) is improved more than before, it is expected that applicable fields of anionic polymerization system using base generators will be significantly expanded.

The curable composition of the present disclosure improves sensitivity (curability) of a curable composition of anionic polymerization system.

Specifically, the curable composition of the present disclosure includes a base amplifier, as well as a polyfunctional isocyanate compound and a compound selected from the group consisting of a multivalent alcohol and an epoxy compound.

By including a base amplifier, a base generated in the composition acts on the multivalent alcohol and/or the epoxy compound to promote generation of a base from the base amplifier, as shown in the scheme in the section "Method of producing cured product" described later. That is, a part of the generated base activates a hydroxyl group of the multivalent alcohol and/or an epoxy group of the epoxy compound, to promote generation of a base from the base amplifier. A part of the generated base serves as a catalyst of a urethane bond formation reaction of the polyvalent isocyanate compound and the multivalent alcohol. If the base is efficiently generated, the urethane bond formation reaction can be promoted to improve the reaction sensitivity.

In the curable composition of the present disclosure, since bases are generated sequentially in the composition, the urethane formation reaction proceeds more rapidly (that is, with good sensitivity) and production of a polyurethane that is a reacted cured product can be favorably performed. In particular, it is possible to improve the curability (urethane formation reactivity) in the case of forming the curable composition into, for example, a thick film (for example, having a thickness of $0.5 \times 10^{-3}$ m or more) and to cause the urethane formation reaction to rapidly progress into the deepest portions of the film.

(Polyfunctional Isocyanate Compound)

The curable composition of the present disclosure includes at least one polyfunctional isocyanate compound. The polyfunctional isocyanate compound reacts with the multivalent alcohol to produce a polyurethane.

The polyfunctional isocyanate compound (hereinafter, also referred to as "polyisocyanate") encompasses an aliphatic polyisocyanate, an aromatic polyisocyanate, and the like. As the polyisocyanate, a compound selected from the group consisting of a bifunctional polyisocyanate and a trifunctional or higher functional polyisocyanate can be arbitrarily selected.

Examples of aliphatic polyisocyanates include trimethylene diisocyanate, propylene-1,2-diisocyanate, butylene diisocyanate, hexamethylene diisocyanate, cyclohexylene diisocyanate, dicyclohexylmethane diisocyanate, isophorone diisocyanate, hydride xylylene diisocyanate, 1,4-bis(isocyanate methyl)cyclohexane, 1,3-bis(isocyanate methyl)cyclohexane, and lysine diisocyanate.

Examples of aromatic polyisocyanates include m-phenylene diisocyanate, p-phenylene diisocyanate, tolylene diisocyanate, naphthalene diisocyanate, diphenylmethane diisocyanate, 3,3'-dimethoxy-biphenyl diisocyanate, 3,3'-dimethyl diphenylmethane-4,4'-diisocyanate, m-xylylene diisocyanate, 4-chloroxylylene-1,3-diisocyanate, 2-methyl-xylylene-1,3-diisocyanate, 4,4'-diphenylpropane diisocyanate, and 4,4'-diphenylhexafluoropropane diisocyanate.

Among these, preferred examples include m-xylylene diisocyanate (XDI), tolylene diisocyanate (TDI), phenylene diisocyanate (PDI), diphenylmethane diisocyanate (MDI), isophorone diisocyanate (IDI), and hexamethylene diisocyanate (HDI).

In the above, diisocyanate compounds are exemplified as bifunctional aliphatic polyisocyanates or aromatic polyisocyanates. However, trifunctional triisocyanates and tetrafunctional tetraisocyanate compounds that are inferred from diisocyanate compounds are also encompassed within the scope of aliphatic polyisocyanates and aromatic polyisocyanates.

Examples of trifunctional or higher functional polyisocyanates include: a trifunctional or higher functional adduct-type isocyanate compound that is an adduct (addition product) of a bifunctional aliphatic isocyanate compound (compound having two isocyanate groups in the molecule) and a compound having three or more active hydrogen groups in the molecule (trifunctional or higher functional polyol, polyamine, polythiol, or the like); and a biuret-type or isocyanurate-type isocyanate compound that is a trimer of a bifunctional aliphatic isocyanate compound.

The content of the polyisocyanate in the curable composition is preferably from 90% by mass to 10% by mass, and more preferably from 80% by mass to 50% by mass, with respect to the total mass of the curable composition.

(Multivalent Alcohol)

The curable composition of the present disclosure can include at least one multivalent alcohol (hereinafter, also referred to as "polyol"), with or without including the epoxy compound described later.

Examples of polyols include ethylene glycol, polyethylene glycol (the polymerization degree may be from 2 to 5, or 6 or more), propylene glycol, polypropylene glycol (the polymerization degree may be from 2 to 5, or 6 or more), 3-methyl-1,3-butanediol, 1,3-butylene glycol, isoprene glycol, 1,2-pentanediol, 1,2-hexanediol, glycerin, polyglycerin (the polymerization degree may be from 2 to 5, or 6 or more), pentaerythritol, and N, N, N', N'-tetrakis(2-hydroxypropyl)ethylenediamine.

The content of the polyol in the curable composition is preferably from 90% by mass to 10% by mass, and more preferably from 60% by mass to 20% by mass, with respect to the total mass of the curable composition.

(Epoxy Compound)

The curable composition of the present disclosure can include at least one epoxy compound, with or without including the multivalent alcohol described above.

Use of epoxy compounds enables the content of multivalent alcohols to be reduced and, if necessary, enables a composition that does not include multivalent alcohols to be achieved. In a composition that includes multivalent alcohols, a reaction with a coexisting base amplifier (reaction of hydroxy groups before application of energy) is likely to progress and, for example, the stability of the composition after long-term storage tends to decrease. Replacing a part or entire of multivalent alcohols with epoxy compounds enables the stability of the curable composition to be further enhanced, and enables the pot life of the curable composition to be further improved.

The epoxy compound is not particularly limited as long as it is a compound having one or more epoxy groups in one molecule, and may be any compound selected from a monomer, an oligomer, or a polymer.

Examples of epoxy monomers include ethyl glycidyl ether, glycidyl phenyl ether, 2-ethylpentyl glycidyl ether, butyl glycidyl ether, a monomer of the compound having the following structure or the like, and a polymer such as an epoxy resin.

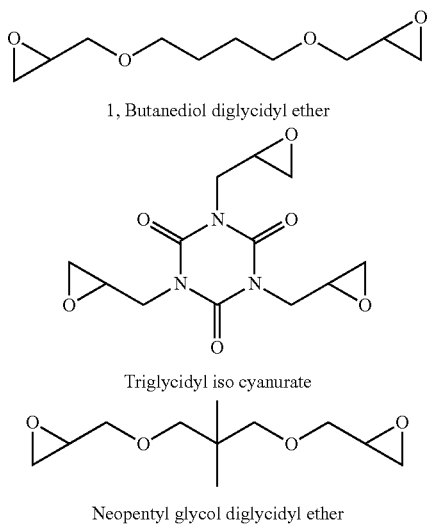

1, Butanediol diglycidyl ether

Triglycidyl iso cyanurate

Neopentyl glycol diglycidyl ether

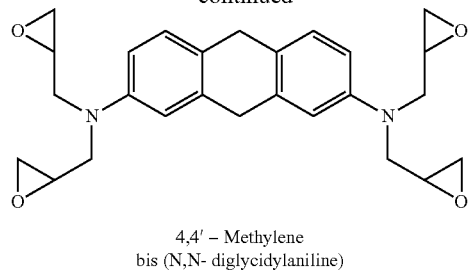

4,4' – Methylene bis (N,N- diglycidylaniline)

Further, the epoxy monomer may be a commercially available product on the market. Examples of commercially available products include: glycidyl ether (e.g., Denacol EX-946L, Denacol EX-991, Denacol EX-991L, Denacol EX-992L) and glycidyl ester (e.g., Denacol EX-1111, Denacol EX-1112), which are manufactured by Nagase Chemtex Co., Ltd.; and a monoepoxy type (e.g., BGE-C, BGE-R, PGE) and a polyepoxy type (e.g., SR-NPG, SR-14BL, SR-16H, SR-TMP, SR-PG, SR-TPG, SR-GLG, SR-DGE, SR-4GL), which are manufactured by Sakamoto Pharmaceutical Co., Ltd.

Examples of epoxy resins include a bisphenol A type epoxy resin, a bisphenol F type epoxy resin, and a novolak glycidyl ether type epoxy resin.

In addition, a commercially available product on the market may be used as the epoxy resin. Examples of commercially available products include: jER828 and jER806, manufactured by Mitsubishi Chemical Co., Ltd.; YDPN-638, manufactured by Nippon Steel Sumitomo Chemical Co., Ltd.; and a polybutadiene type epoxy resin (e.g., Denarex R15EPT, Denarex FCA-061L, Denarex FCA-061M), manufactured by Nagase Chemtex Co., Ltd.

Other examples of epoxy compounds can include a compound having a glycidyl group and a hydroxy group, which is more favorable as the substitute compound for a multivalent alcohol. Specific examples thereof include glycerol polyglycidyl ether, diglycerol polyglycidyl ether, polyglycerol polyglycidyl ether, pentaerythritol polyglycidyl ether, and sorbitol polyglycidyl ether.

The content of the epoxy compound in the curable composition is preferably from 90% by mass to 10% by mass, and more preferably from 60% by mass to 20% by mass, with respect to the total mass of the curable composition.

(Base Amplifier)

The curable composition of the present disclosure includes at least one base amplifier (chain curing agent).

Due to inclusion of a base amplifier, bases are generated sequentially in the composition when energy such as light or heat is applied. Therefore, the urethane formation reaction progresses more rapidly (that is, with favorable sensitivity). As a result, production of a polyurethane that is a reacted cured product can be favorably performed.

The base amplifier is a compound that decomposes by the action of a base in the system to newly generate a base molecule. Such an autocatalytic reaction that newly generates a base as a result of decomposition reaction by a base is called a base amplification reaction. The base amplifier is desirably a base amplifier that is decomposed by the action of a base in the system, that newly releases a base molecule during the decomposition process, and that is stable in the absence of a base. The base amplifier decomposes in a self-amplifying manner by allowing a smaller equivalent amount of base to act on a certain amount of the base amplifier, and the entire amount ultimately decomposes, by which a large amount of base, corresponding to the amount of the base amplifier, can be generated.

Examples of base amplifiers can include a compound having a carbamate structure in the molecule. In the case of a compound having a carbamate structure, an aliphatic amine is generated as a base. Further, the base amplifier may be a compound that generates a polyfunctional amine. A compound that generates a polyfunctional amine is favorable as a component of the curable composition. Specific examples of base amplifiers can include the compounds described in paragraphs [0010] to [0032] of JP-A No. 2000-330270 and paragraphs [0116] to [0146] of JP-A No. 2006-20539.

For details of base amplifiers, the description of "New Trends in Photofunctional Polymer Materials—Latest Technologies and Prospects Thereof—" (supervised by Kunihiro Ichimura, CMC Publishing, 2008) can be referred to.

Preferred examples of the base amplifier include a compound represented by the following General Formula (1).

Conventionally known base generators tend to generate not only bases but also gases such as carbon dioxide ($CO_2$) when energy such as light or heat is applied. On the other hand, the base amplifier represented by General Formula (1) activates a hydroxyl group that is generated, by a base in the composition, from the multivalent alcohol and/or the epoxy compound, and decomposes to generate a base, but does not emit gases such as carbon dioxide. In addition, the residual group after releasing a base is incorporated into the cured product. That is, the base amplifier has an advantage of, in exerting its action, not generating carbon dioxide and other unnecessary decompositions of low molecules.

(1)

In the formula, G represents an organic group; and X is a group represented by the following General Formula (1)-11, General Formula (1)-12, General Formula (1)-13, or General Formula (1)-14.

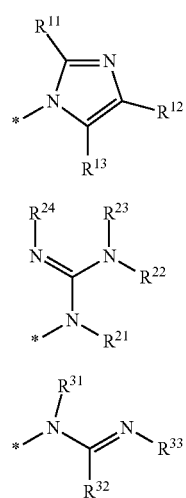

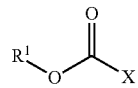

In the formulae, each of $R^{11}$, $R^{12}$, $R^{13}$, $R^{21}$, $R^{22}$, $R^{23}$, $R^{24}$, $R^{31}$, $R^{32}$, $R^{33}$, $R^{41}$, $R^{42}$, $R^{43}$, and $R^{44}$ independently represents a hydrogen atom or a hydrocarbon group; when two or more of $R^{11}$, $R^{12}$, or $R^{13}$ are hydrocarbon groups, the two or more hydrocarbon groups may be bonded to each other to form a ring; when two or more of $R^{21}$, $R^{22}$, $R^{23}$, or $R^{24}$ are hydrocarbon groups, the two or more hydrocarbon groups may be bonded to each other to form a ring; when two or more of $R^{31}$, $R^{32}$, or $R^{33}$ are hydrocarbon groups, the two or more hydrocarbon groups may be bonded to each other to form a ring; when two or more of $R^{41}$, $R^{42}$, $R^{43}$ or $R^{44}$ are hydrocarbon groups, the two or more hydrocarbon groups may be bonded to each other to form a ring; and * represents a site that is bonded to a carbon atom.

The compound represented by General Formula (1) is a compound having a carboxylic acid amide bond that is formed by bonding a nitrogen atom in X to a carbon atom of a carbonyl group.

Further, the compound represented by General Formula (1) has a characteristic that the bond between the carbonyl group and X present in the structure was cleaved under specific conditions, to produce a basic compound (herein, also simply referred to as a "base") having a structure in which the nitrogen atom in X that has been bonded to the carbon atom of the carbonyl group is bonded to a hydrogen atom. This characteristic will be described later.

As will be described later, the compound represented by General Formula (1) has a base conversion action of generating a base by the action of a base, and a base amplification action of generating a base in self-amplifying manner.

In General Formula (1), G is an organic group.

The organic group is not particularly limited, and can be appropriately selected from monovalent groups containing a carbon atom as a constituent atom. In the present disclosure, the organic group is preferably an organic group that forms an ester structure or an amide structure with the adjacent carbonyl group, from the viewpoint of more effectively exerting the effects of the present disclosure. When the organic group is an organic group that forms an ester structure or an amide structure with the adjacent carbonyl group, for example, a portion other than the portion that forms an ester structure or an amide structure with the adjacent carbonyl group may be a substituent group having a hydrocarbon group or the like.

When the organic group is an organic group that forms an ester structure or an amide structure with the adjacent carbonyl group, the compound represented by General Formula (1) preferably includes at least one compound selected from the group consisting of a compound represented by the following General Formula (1)-A and a compound represented by the following General Formula (1)-B.

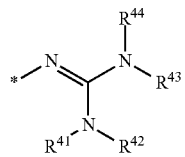

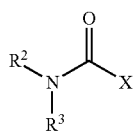

(1)-B

In the formulae, $R^1$ represents an organic group; each of $R^2$ and $R^3$ independently represents a hydrogen atom or an organic group; each X independently represents the group represented by General Formula (1)-11, General Formula (1)-12, General Formula (1)-13, or General Formula (1)-14; at least one of $R^2$ or $R^3$ represents an organic group; and when $R^2$ and $R^3$ are both organic groups, they may be bonded to each other to form a ring.

Examples of the organic group as G in General Formula (1), as $R^1$ in General Formula (1)-A, or as $R^2$ or $R^3$ in General Formula (1)-B include a hydrocarbon group that may have a substituent group.

That "hydrocarbon group has a substituent group" means that one or more hydrogen atoms constituting the hydrocarbon group are substituted by a group (substituent group) other than hydrogen atom, or that one or more carbon atoms constituting the hydrocarbon group, or the carbon atoms together with one or more hydrogen atoms bonded thereto are substituted by a group (substituent group) that is different from the carbon atoms or the carbon atoms to which one or more hydrogen atoms are bonded. The hydrogen atom(s) and the carbon atom(s) may be both substituted by a substituent group.

The hydrocarbon group may be either an aliphatic hydrocarbon group or an aromatic hydrocarbon group (aryl group), may be an aliphatic hydrocarbon group of which one or more hydrogen atoms are substituted by an aromatic hydrocarbon group, or may be a polycyclic hydrocarbon group formed by condensation of a cyclic aliphatic hydrocarbon group and an aromatic hydrocarbon group.

The aliphatic hydrocarbon group may be either a saturated aliphatic hydrocarbon group (alkyl group) or an unsaturated aliphatic hydrocarbon group.

The alkyl group may be linear, branched, or cyclic and, in the case of being cyclic, it may be monocyclic or polycyclic. The alkyl group preferably has 1 to 20 carbon atoms.

The linear or branched alkyl group preferably has 1 to 20 carbon atoms.

Examples of the linear or branched alkyl group include a methyl group, an ethyl group, an n-propyl group, an isopropyl group, an n-butyl group, an isobutyl group, a sec-butyl group, a tert-butyl group, an n-pentyl group, an isopentyl group, an neopentyl group, a tert-pentyl group, a 1-methylbutyl group, an n-hexyl group, a 2-methylpentyl group, a 3-methylpentyl group, a 2,2-dimethylbutyl group, a 2,3-dimethylbutyl group, an n-heptyl group, a 2-methylhexyl group, a 3-methylhexyl group, a 2,2-dimethylpentyl group, a 2,3-dimethylpentyl group, a 2,4-dimethylpentyl group, a 3,3-dimethylpentyl group, an 3-ethylpentyl group, a 2,2,3-trimethylbutyl group, an n-octyl group, an isooctyl group, an 2-ethylhexyl group, a nonyl group, a decyl group, an undecyl group, a dodecyl group, a tridecyl group, a tetradecyl group, a pentadecyl group, a hexadecyl group, a heptadecyl group, an octadecyl group, a nonadecil group, and an icosyl group.

The cyclic alkyl group preferably has 3 to 20 carbon atoms.

Examples of the cyclic alkyl group include a cyclopropyl group, a cyclobutyl group, a cyclopentyl group, a cyclohexyl group, a cycloheptyl group, a cyclooctyl group, a cyclononyl group, a cyclodecyl group, a norbornyl group, an isobornyl group, an 1-adamantyl group, an 2-adamantyl group, a tricyclodecyl group, and those in which one or more hydrogen atoms of these cyclic alkyl groups are substituted by a linear, branched, or cyclic alkyl group. Examples of the linear, branched, or cyclic alkyl group that substitutes a hydrogen atom include those described above as examples of the alkyl group.

Further, the unsaturated aliphatic hydrocarbon group may be linear, branched, or cyclic.

In the case of a cyclic unsaturated aliphatic hydrocarbon group, it may be either monocyclic or polycyclic, and the number of carbon atoms of the unsaturated aliphatic hydrocarbon group is preferably 2 to 20.

Examples of the unsaturated aliphatic hydrocarbon group include a group in which one or more single bonds (C—C) between carbon atoms in the alkyl group described above have been substituted by a double bond (C=C) or a triple bond (C≡C), which is an unsaturated bond.

In the unsaturated aliphatic hydrocarbon group, the number of unsaturated bonds may be only one, or two or more. In the case of two or more, these unsaturated bonds may be only double bonds, only triple bonds, or a mixture of double bond(s) and triple bond(s).

In the unsaturated aliphatic hydrocarbon group, the position of unsaturated bond is not particularly limited.

Preferred examples of the unsaturated aliphatic hydrocarbon group include a linear or branched alkenyl group, a linear or branched alkynyl group, a cycloalkenyl group, and a cycloalkynyl group, each of which corresponds to the group having one unsaturated bond described above.

Examples of the alkenyl group include an ethenyl group (vinyl group), a 2-propenyl group (allyl group), and a cyclohexenyl group.

The aryl group may be either monocyclic or polycyclic, and preferably has 6 to 20 carbon atoms. Examples of the aryl group include a phenyl group, a 1-naphthyl group, a 2-naphthyl group, an o-tolyl group, a m-tolyl group, a p-tolyl group, a xylyl group (dimethylphenyl group), and those in which one or more hydrogen atoms of these aryl groups are substituted by the above-described aryl group or the alkyl group. The aryl group that has a substituent group preferably has 6 to 20 carbon atoms including that of the substituent group.

Among the hydrocarbon groups, examples of the aliphatic hydrocarbon group of which one or more hydrogen atoms have been substituted by an aromatic hydrocarbon group (aryl group) include, as substituent number of hydrogen atoms being one, an arylalkyl group (aralkyl group) such as a phenylmethyl group (benzyl group) and a 2-phenylethyl group (phenethyl group).

In the hydrocarbon group, examples of the substituent group with which one or more hydrogen atoms are replaced include an alkoxy group, an aryloxy group, a dialkylamino group, a diarylamino group, an alkylaryl group, an alkylcarbonyl group, an arylcarbonyl group, a heteroarylcarbonyl group, an alkyloxycarbonyl group, an aryloxycarbonyl group, an alkylcarbonyloxy group, an arylcarbonyloxy group, an alkylthio group, an arylthio group, an oxygen atom (—O—), a cyano group (—CN), a halogen atom, a nitro group, a haloalkyl group (alkyl halide group), a hydroxyl group (—OH), and a mercapto group (—SH).

In the hydrocarbon group, the substituent group that substitutes a hydrogen atom may be only one, two or more, or all hydrogen atoms may be substituted by the substituent group.

In the hydrocarbon group, in a case in which the number of substituent groups that substitute a hydrogen atom is two or more, these substituent groups may be entirely the same as each other, may be entirely different from each other, or may be partially the same as each other.

Examples of the alkoxy group as a substituent group include a monovalent group formed by bonding the alkyl group to an oxygen atom, such as a methoxy group, an ethoxy group, an n-propoxy group, an isopropoxy group, and a cyclopropoxy group.

Examples of the aryloxy group as a substituent group include a monovalent group formed by bonding the aryl group to an oxygen atom, such as a phenyloxy group (phenoxy group), a 1-naphthyloxy group, and a 2-naphthyloxy group.

Examples of the dialkylamino group as a substituent group include a monovalent group formed by substituting two hydrogen atoms of an amino group ($-NH_2$) by the alkyl groups, such as a dimethylamino group and a methylethylamino group. In the dialkylamino group, the two alkyl groups that are bonded to the nitrogen atom may be the same as or different from each other.

Examples of the diarylamino group as a substituent group include a monovalent group formed by substituting two hydrogen atoms of an amino group by the aryl groups, such as a diphenylamino group and a phenyl-1-naphthylamino group. In the diarylamino group, the two aryl groups that are bonded to the nitrogen atom may be the same as or different from each other.

Examples of the alkylarylamino group as a substituent group include a monovalent group formed by substituting one of two hydrogen atoms of an amino group by the aryl group and substituting the other thereof by the aryl group, such as a methylphenylamino group.

Examples of the alkylcarbonyl group as a substituent group include a monovalent group formed by bonding the alkyl group to a carbonyl group ($-C(=O)-$), such as a methylcarbonyl group (acetyl group).

Examples of the arylcarbonyl group as a substituent group include a monovalent group formed by bonding the aryl group to a carbonyl group, such as a phenylcarbonyl group (benzoyl group).

Examples of the heteroarylcarbonyl group as a substituent group include a monovalent group formed by bonding an aromatic heterocyclic group (heteroaryl group) and a carbonyl group to each other, such as an imidazolylcarbonyl group, a pyrazolylcarbonyl group, and a pyrazinylcarbonyl group.

Examples of the alkyloxycarbonyl group as a substituent group include a monovalent group formed by bonding the alkoxy group to a carbonyl group, such as a methyloxy carbonyl group (methoxycarbonyl group).

Examples of the aryloxycarbonyl group as a substituent group include a monovalent group formed by bonding the aryloxy group to a carbonyl group, such as a phenyloxycarbonyl group (phenoxycarbonyl group).

Examples of the alkylcarbonyloxy group as a substituent group include a monovalent group formed by bonding the alkyl group to the carbon atom of a carbonyloxy group ($-C(=O)-O-$), such as a methylcarbonyloxy group.

Examples of the arylcarbonyloxy group as a substituent group include a monovalent group formed by bonding the aryl group to the carbon atom of a carbonyloxy group, such as a phenylcarbonyloxy group.

Examples of the alkylthio group as a substituent group include a monovalent group by bonding the alkyl group to a sulfur atom, such as a methylthio group, an ethylthio group, a n-propylthio group, an isopropylthio group, and a cyclopropylthio group.

Examples of the arylthio group as a substituent group include a monovalent group formed by bonding the aryl group to a sulfur atom, such as a phenylthio group, a 1-naphthylthio group, and a 2-naphthylthio group.

Examples of the halogen atom as a substituent include a fluorine atom (—F), a chlorine atom (—Cl), a bromine atom (—Br), and an iodine atom (—I).

Examples of the haloalkyl group as a substituent group include a group formed by substituting one or more hydrogen atoms of the alkyl group by a halogen atom.

Examples of the halogen atom in the haloalkyl group include those exemplified above as the halogen atom as a substituent group.

The number of halogen atoms in the haloalkyl group is not particularly limited, and may be one, or two or more. When the number of halogen atoms in the haloalkyl group is two or more, the plurality of halogen atoms may be entirely the same as each other, may be entirely different from each other, or may be partially the same as each other. The haloalkyl group may be a perhaloalkyl group in which all hydrogen atoms in the alkyl group are substituted by halogen atoms.

Examples of the haloalkyl group include, but are not limited to, a chloromethyl group, a dichloromethyl group, a trichloromethyl group, and a trifluoromethyl group.

In the hydrocarbon group, the number of substituent groups substituting the hydrogen atom is, although depending on the number of hydrogen atoms that can be substituted, preferably 1 to 4, more preferably 1 to 3, and particularly preferably 1 or 2.

In the hydrocarbon group, examples of the substituent group by which one or more carbon atoms are substituted or the carbon atom is substituted together with one or more hydrogen atoms bonded thereto, include a hetero atom, such as a nitrogen atom, an oxygen atom, and a sulfur atom.

In the hydrocarbon group, the substituent group substituting a carbon atom, or a carbon atom to which a hydrogen atom is bonded may be only one, or may be two or more, and all carbon atoms may be substituted by the substituent groups singly or together with a hydrogen atom bonded to the carbon atom.

In the hydrocarbon group, in the case in which the number of substituent groups substituting a carbon atom, or a carbon atom to which a hydrogen atom is bonded is two or more, these substituent groups may be entirely the same as each other, may be entirely different from each other, or may be partially the same as each other.

Among the hydrocarbon groups substituted by hetero atoms, examples of an aromatic hydrocarbon group, i.e., an aromatic heterocyclic group (heteroaryl group) include a group that is formed by removing, from each aromatic heterocyclic compound, one hydrogen atom that is bonded to a carbon atom or a hetero atom that constitutes the ring skeleton.

Preferred examples of the aromatic heterocyclic compound include a sulfur-containing aromatic heterocyclic compound (compound containing one or more sulfur atoms as an atom constituting the aromatic heterocyclic skeleton), a nitrogen-containing aromatic heterocyclic compound (compound containing one or more nitrogen atoms as an atom constituting the aromatic heterocyclic skeleton), an oxygen-containing aromatic heterocyclic compound (compound containing one or more oxygen atoms as an atom constituting the aromatic heterocyclic skeleton), and a compound containing, as atoms constituting the aromatic heterocyclic skeleton, two heteroatoms that are selected from an sulfur atom, a nitrogen atom, or an oxygen atom, and that are different from each other.

Examples of the sulfur-containing aromatic heterocyclic compound include thiophene, and benzothiophene.

Examples of the nitrogen-containing aromatic heterocyclic compound include pyrrole, imidazole, pyrazole, pyridine, pyrazine, pyrimidine, pyridazine, triazine, indole, isoindole, benzoimidazole, purine, indazole, quinoline, isoquinolin, quinoxaline, quinazoline, and cinnoline.

Examples of the oxygen-containing aromatic heterocyclic compound include furan, benzofuran (1-benzofuran), and isobenzofuran (2-benzofuran).

Examples of the compound containing, as atoms constituting the aromatic heterocyclic skeleton, two heteroatoms that are different from each other include oxazole, isoxazole, thiazole, benzoxazole, benzisoxazole, and benzothiazole.

In the hydrocarbon group, the number of substituent groups substituting a carbon atom, or a carbon atom to which a hydrogen atom is bonded is, although depending on the substitutable carbon atom, preferably 1 to 3 and more preferably 1 or 2.

Among the above, preferred examples of G in General Formula (1) include: an alkoxy group formed by substituting one hydrogen atom of the alkyl group by a carbonyl group; and a substituted aryl group formed by substituting one hydrogen atom of the aryl group by a substituent group (preferably, a phenyl group that has been substituted by a heteroarylcarbonyl group).

Among the compounds in which G is an alkoxy group, the compound represented by General Formula (1)-A is preferable.

Each of the organic groups as $R^1$ to $R^3$ in General Formula (1)-A and General Formula (1)-B is independently preferably an alkyl group that may have a substituent group, an alkenyl group that may have a substituent group, an aryl group that may have a substituent group, a heteroaryl group that may have a substituent group, or an arylalkyl group that may have a substituent group, and more preferably an alkyl group that may have a substituent group.

The substituent group here is the same as the above-described substituent group that is contained in the hydrocarbon group.

Among these, it is preferable that each of $R^1$ and $R^2$ is independently an alkyl group that may have a substituent group, an alkenyl group that may have a substituent group, an aryl group that may have a substituent group, or a heteroalkyl group that may have a substituent group, or an arylalkyl group that may have a substituent group, and $R^3$ is a hydrogen atom. It is more preferable that each of $R^1$ and $R^2$ is independently an alkyl group that may have a substituent group, and $R^3$ is a hydrogen atom.

Next, X in the above-described General Formula (1), General Formula (1)-A, and General Formula (1)-B will be described.

X is a group represented by the above-described General Formula (1)-11, General Formula (1)-12, General Formula (1)-13, or General Formula (1)-14.

Further, the bond with the symbol * is formed toward the carbon atom to which X is bonded, that is, the carbon atom in the carbonyl group to which G is bonded in General Formula (1).

In General Formula (1)-11, General Formula (1)-12, General Formula (1)-13, and General Formula (1)-14, each of $R^{11}$, $R^{12}$, $R^{13}$, $R^{21}$, $R^{22}$, $R^{23}$, $R^{24}$, $R^{31}$, $R^{32}$, $R^{33}$, $R^{41}$, $R^{42}$, $R^{43}$, and $R^{44}$ independently represents a hydrogen atom or a hydrocarbon group.

That is, $R^{11}$, $R^{12}$, and $R^{13}$ in General Formula (1)-11 (hereinafter, also abbreviated as "$R^{11}$ to $R^{13}$") may be entirely the same as each other, may be entirely different from each other, or may be partially the same as each other.

Similarly, $R^{21}$, $R^{22}$, $R^{23}$ and $R^{24}$ in General Formula (1)-12 (hereinafter, also abbreviated as "$R^{21}$ to $R^{24}$") may be entirely the same as each other, may be entirely different from each other, or may be partially the same as each other.

Similarly, $R^{31}$, $R^{32}$, and $R^{33}$ in General Formula (1)-13 (hereinafter, also abbreviated as "$R^{31}$ to $R^{33}$") may be entirely the same as each other, may be entirely different from each other, or may be partially the same as each other.

Similarly, $R^{41}$, $R^{42}$, $R^{43}$, and $R^{44}$ in General Formula (1)-14 (hereinafter, also abbreviated as "$R^{41}$ to $R^{44}$") may be entirely the same as each other, may be entirely different from each other, or may be partially the same as each other.

Each of the hydrocarbon groups as $R^{11}$ to $R^{13}$, $R^{21}$ to $R^{24}$, $R^{31}$ to $R^{33}$, and $R^{41}$ to $R^{44}$ may be either an aliphatic hydrocarbon group or an aromatic hydrocarbon group (aryl group), may be an aliphatic hydrocarbon group formed by substituting one or more hydrogen atoms by an aromatic hydrocarbon group, or may be a polycyclic hydrocarbon group formed by condensation of a cyclic aliphatic hydrocarbon group and an aromatic hydrocarbon group.

The aliphatic hydrocarbon group may be either a saturated aliphatic hydrocarbon group (alkyl group) or an unsaturated aliphatic hydrocarbon group.

The alkyl group may be linear, branched, or cyclic and, in the case of being cyclic, it may be monocyclic or polycyclic. The alkyl group preferably has 1 to 20 carbon atoms.

The linear or branched alkyl group preferably has 1 to 20 carbon atoms.

Examples of the linear or branched alkyl group include a methyl group, an ethyl group, an n-propyl group, an isopropyl group, an n-butyl group, an isobutyl group, a sec-butyl group, a tert-butyl group, an n-pentyl group, an isopentyl group, an neopentyl group, a tert-pentyl group, a 1-methylbutyl group, an n-hexyl group, a 2-methylpentyl group, a 3-methylpentyl group, a 2,2-dimethylbutyl group, a 2,3-dimethylbutyl group, an n-heptyl group, a 2-methylhexyl group, a 3-methylhexyl group, a 2,2-dimethylpentyl group, a 2,3-dimethylpentyl group, a 2,4-dimethylpentyl group, a 3,3-dimethylpentyl group, an 3-ethylpentyl group, a 2,2,3-trimethylbutyl group, an n-octyl group, an isooctyl group, an 2-ethylhexyl group, an nonyl group, a decyl group, an undecyl group, a dodecyl group, a tridecyl group, a tetradecyl group, a pentadecyl group, a hexadecyl group, a heptadecyl group, an octadecyl group, a nonadecil group, and an icosyl group.

The cyclic alkyl group preferably has 3 to 20 carbon atoms.

Examples of the cyclic alkyl group include a cyclopropyl group, a cyclobutyl group, a cyclopentyl group, a cyclohexyl group, a cycloheptyl group, a cyclooctyl group, a cyclononyl group, a cyclodecyl group, a norbornyl group, an isobornyl group, an 1-adamantyl group, an 2-adamantyl group, a tricyclodecyl group, and those in which one or more hydrogen atoms of these cyclic alkyl groups are substituted by a linear, branched, or cyclic alkyl group. Examples of the linear, branched, or cyclic alkyl group that substitutes the hydrogen atom include those exemplified above as the alkyl group.

Further, the unsaturated aliphatic hydrocarbon group may be linear, branched, or cyclic.

In the case of a cyclic unsaturated aliphatic hydrocarbon group, it may be either monocyclic or polycyclic, and the unsaturated aliphatic hydrocarbon group preferably has 2 to 20 carbon atoms.

Examples of the unsaturated aliphatic hydrocarbon group include a group formed by substituting one or more single bonds (C—C) between carbon atoms in the alkyl group described above by a double bond (C=C) or a triple bond (C≡C), which is an unsaturated bond.

In the unsaturated aliphatic hydrocarbon group, the number of unsaturated bonds may be only one, or two or more. In the case of two or more, these unsaturated bonds may be only double bonds, only triple bonds, or a mixture of double bond(s) and triple bond(s).

In the unsaturated aliphatic hydrocarbon group, the position of unsaturated bond is not particularly limited.

Preferred examples of the unsaturated aliphatic hydrocarbon group include a linear or branched alkenyl group or alkynyl group, and a cyclic cycloalkenyl group or cycloalkynyl group, each of which corresponds to the group having one unsaturated bond described above.

Examples of the alkenyl group include an ethenyl group (vinyl group), a 2-propenyl group (allyl group), and a cyclohexenyl group.

The aryl group may be either monocyclic or polycyclic, and preferably has 6 to 20 carbon atoms. Examples of the aryl group include a phenyl group, a 1-naphthyl group, a 2-naphthyl group, an o-tolyl group, a m-tolyl group, a p-tolyl group, a xylyl group (dimethylphenyl group), and those in which one or more hydrogen atoms of these aryl groups are substituted by the above-described aryl group or alkyl group. The aryl group that has a substituent group preferably has 6 to 20 carbon atoms including that of the substituent group.

When two or more of $R^{11}$, $R^{12}$, or $R^{13}$ in General Formula (1)-11 are hydrocarbon groups, these hydrocarbon groups may be bonded to each other to form a ring together with the carbon atom (carbon atom constituting the imidazole skeleton) to which these hydrocarbon groups are bonded. Here, "two or more of hydrocarbon groups are bonded to each other" refers to a case in which only two or all (three) of $R^{11}$ to $R^{13}$ are hydrocarbon groups, and any two of the hydrocarbon groups are bonded to each other, or refers to a case in which all (three) of $R^{11}$ to $R^{13}$ are hydrocarbon groups, and all of these hydrocarbon groups are bonded to each other. In either case, the carbon atoms of these hydrocarbon groups are bonded to each other.

When the two or more hydrocarbon groups are bonded to each other, the position (bonding position) at which the carbon atoms are bonded is not particularly limited. For example, when the hydrocarbon group to be bonded is linear or branched, the bonding position may be the carbon atom at the end of the hydrocarbon group, may be the so-called "root" carbon atom of the hydrocarbon group that is directly bonded to the carbon atom constituting the imidazole skeleton, or may be a carbon atom midway between the end and the root. On the other hand, when the hydrocarbon group to be bonded is cyclic or has both a chain structure and a cyclic structure, the bond position may be the beginning carbon atom or a carbon atom other than it.

When two hydrocarbon groups of $R^{11}$ to $R^{13}$ are bonded to each other, the ring formed thereby may be either monocyclic or polycyclic. The group represented by General Formula (1)-11 has a structure in which the imidazole skeleton is condensed with a ring that is formed by bonding of these hydrocarbon groups When two or more of $R^{21}$, $R^{22}$, $R^{23}$, or $R^{24}$ in General Formula (1)-12 are hydrocarbon groups, these hydrocarbon groups may be bonded to each other to form a ring together with the nitrogen atoms to which the hydrocarbon groups are bonded, and the carbon atom which is bonded to the nitrogen atoms (the carbon atom to which the three nitrogen atoms are bonded). Here, "two or more of hydrocarbon groups are bonded to each other" refers to a case similar to a case in which any of the hydrocarbon groups of $R^{11}$ to $R^{13}$ are bonded to each other as described above. For example, as such a bonding manner, there is a case in which only two or three or all (four) of $R^{21}$ to $R^{24}$ are hydrocarbon groups, and any two or three of the hydrocarbon groups are bonded to each other, or a case in which all (four) of $R^{21}$ to $R^{24}$ are hydrocarbon groups, and all of these hydrocarbon groups are bonded to each other. The bonding manner of the hydrocarbon groups to each other is also the same as $R^{11}$ to $R^{13}$.

When two or more of $R^{31}$, $R^{32}$, or $R^{33}$ in General Formula (1)-13 are hydrocarbon groups, these hydrocarbon groups may be bonded to each other to form a ring together with the nitrogen atom(s) or the carbon atom to which the hydrocarbon groups are bonded, and the carbon atom which is bonded to the nitrogen atoms or the nitrogen atom(s) which is bonded to the carbon atom. Here, "two or more of hydrocarbon groups are bonded to each other" refers to a case similar to a case in which any of the hydrocarbon groups of $R^{11}$ to $R^{13}$ are bonded to each other as described above. For example, as such a bonding manner, there is a case in which only two or all (three) of $R^{31}$ to $R^{33}$ are hydrocarbon groups, and any two of the hydrocarbon groups are bonded to each other, or a case in which all (three) of $R^{31}$ to $R^{33}$ are hydrocarbon groups, and all of these hydrocarbon groups are bonded to each other. The bonding manner of the hydrocarbon groups to each other is also the same as $R^{11}$ to $R^{13}$.

When two or more of $R^{41}$, $R^{42}$, $R^{43}$, or $R^{44}$ in General Formula (1)-14 are hydrocarbon groups, these hydrocarbon groups may be bonded to each other to form a ring together with the nitrogen atoms to which the hydrocarbon groups are bonded, and the carbon atom which is bonded to the nitrogen atoms (the carbon atom to which the three nitrogen atoms are bonded). Here, "two or more of hydrocarbon groups are bonded to each other" refers to a case similar to a case in which any of the hydrocarbon groups of $R^{11}$ to $R^{13}$ are bonded to each other as described above. For example, as such a bonding manner, there is a case in which only two or three or all (four) of $R^{41}$ to $R^{44}$ are hydrocarbon groups, and any two or three of the hydrocarbon groups are bonded to each other, or a case in which all (four) of $R^{41}$ to $R^{44}$ are hydrocarbon groups, and all of these hydrocarbon groups are bonded to each other. The bonding manner of the hydrocarbon groups to each other is also the same as $R^{11}$ to $R^{13}$.

Further, the compound represented by General Formula (1) is classified into a compound represented by the following General Formula (1)-1 (hereinafter, also referred to as "compound (1)-1"), a compound represented by the following General Formula (1)-2 (hereinafter, also referred to as "compound (1)-2"), a compound represented by the following General Formula (1)-3 (hereinafter, also referred to as "compound (1)-3"), and a compound represented by the following General Formula (1)-4 (hereinafter, also referred to as "compound (1)-4").

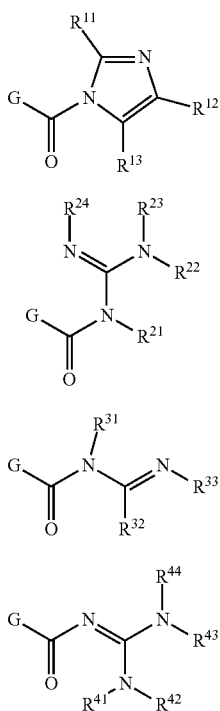

(1)-1

(1)-2

(1)-3

(1)-4

In General Formula (1)-1 to General Formula (1)-4, the definitions and the preferred embodiments of G, $R^{11}$, $R^{12}$, $R^{13}$, $R^{21}$, $R^{22}$, $R^{23}$, $R^{24}$, $R^{31}$, $R^{32}$, $R^{33}$, $R^{41}$, $R^{42}$, $R^{43}$, and $R^{44}$ are the same as those as described above.

Preferred examples of the compound (1)-1 include a compound represented by the following General Formula (1)-1A (hereinafter, sometimes abbreviated as "compound (1)-1A") and a compound represented by the following General Formula (1)-1B (hereinafter, sometimes abbreviated as "compound (1)-1B").

carbon groups are not bonded to each other to form a ring. That is, the compound (1)-1A does not have a structure in which the imidazole skeleton indicated in General Formula (1)-1A is condensed, whatever groups $R^{11'}$, $R^{12'}$, and $R^{13'}$ are.

Each of $R^{11'}$, $R^{12'}$, and $R^{13'}$ is preferably a hydrogen atom, an alkyl group, or an aryl group.

In General Formula (1)-1B, $R^{O11}$ represents a hydrocarbon ring. That is, in General Formula (1)-1B, $R^{O11}$ is a hydrocarbon ring (cyclic hydrocarbon group) that shares, with the imidazole skeleton, the adjacent two carbon atoms in the imidazole skeleton to be condensed with the imidazole skeleton.

The compound (1)-1B is a compound (1)-1 in which the hydrocarbon groups $R^{12}$ and $R^{13}$ are bonded to each other to form a ring.

$R^{O11}$ may be either monocyclic or polycyclic, and is preferably a saturated aliphatic hydrocarbon ring such as a cyclohexane ring, or an aromatic hydrocarbon ring such as a benzene ring or a naphthalene ring.

Preferred examples of the compound (1)-1A include those in which at least one of $R^{11'}$, $R^{12'}$, and $R^{13'}$ is a hydrogen atom.

Preferred examples of the compound (1)-1B include those in which $R^{O11}$ is an aromatic hydrocarbon ring.

Preferred examples of the compound (1)-2 include a compound represented by the following General Formula (1)-2A (hereinafter, also referred to as "compound (1)-2A"), a compound represented by the following General Formula (1)-2B (hereinafter, also referred to as "compound (1)-2B"), a compound represented by the following General Formula (1)-2C (hereinafter, also referred to as "compound (1)-2C"), a compound represented by the following General Formula (1)-2D (hereinafter, also referred to as "compound (1)-2D"), and a compound represented by the following General Formula (1)-2E (hereinafter, also referred to as "compound (1)-2E").

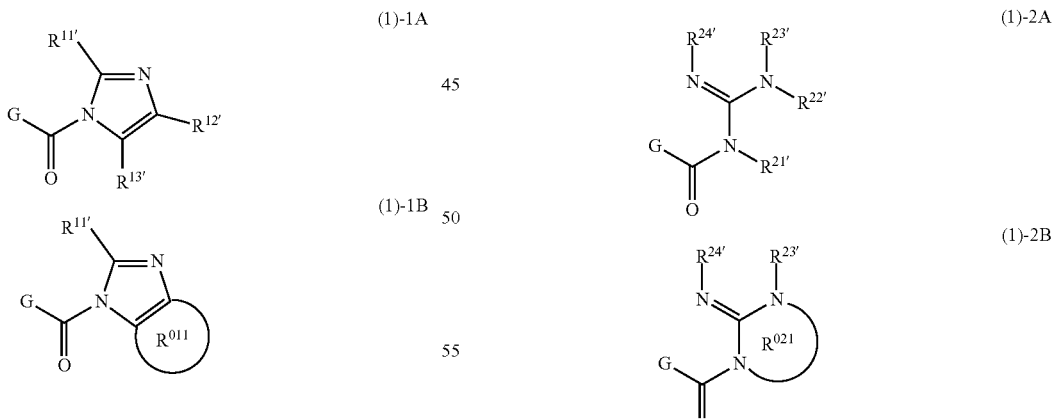

In General Formula (1)-1A and General Formula (1)-1B, each G is the same as that described above; each of $R^{11'}$, $R^{12'}$, and $R^{13'}$ independently represents a hydrogen atom or a hydrocarbon group; and $R^{O11}$ represents a hydrocarbon ring.

In General Formula (1)-1A and General Formula (1)-1B, each of $R^{11'}$, $R^{12'}$, and $R^{13'}$ independently represents a hydrogen atom or a hydrocarbon group.

The hydrocarbon groups as $R^{11'}$, $R^{12'}$, and $R^{13'}$ are the same as those as $R^{11}$, $R^{12}$, and $R^{13}$, except that the hydro-

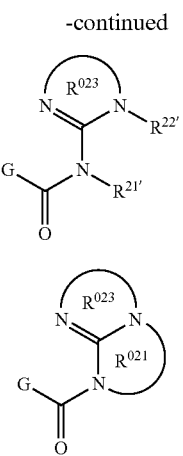

In General Formula (1)-2A to General Formula (1)-2E, each G is the same as that described above; each of $R^{21'}$, $R^{22'}$, $R^{23'}$, and $R^{24'}$ independently represents a hydrogen atom or a hydrocarbon group; and each of $R^{021}$, $R^{022}$, and $R^{023}$ independently represents a nitrogen-containing ring.

In General Formula (1)-2A to General Formula (1)-2E, each of $R^{21'}$, $R^{22'}$, $R^{23'}$, and $R^{24'}$ independently represents a hydrogen atom or a hydrocarbon group.

The hydrocarbon groups as $R^{21'}$, $R^{22'}$, $R^{23'}$, and $R^{24'}$ are the same as those as $R^{11}$, $R^{12}$, and $R^{13}$, except that the hydrocarbon groups are not bonded to each other to form a ring.

Each of $R^{21'}$, $R^{22'}$, $R^{23'}$, and $R^{24'}$ is preferably a hydrogen atom, an alkyl group, or an aryl group, and more preferably an alkyl group or an aryl group.

In General Formula (1)-2B, $R^{021}$ represents a nitrogen-containing ring. Herein, a "nitrogen-containing ring" means a cyclic structure containing a nitrogen atom in addition to carbon atoms and hydrogen atoms. That is, in General Formula (1)-2B, $R^{021}$ is a ring structure (nitrogen-containing cyclic group) that contains, as constituent atoms of the ring skeleton: the nitrogen atom that is bonded to the carbon atom of the carbonyl group described in the general formula; the nitrogen atom to which $R^{23'}$ is bonded; and one carbon atom that is located between these two nitrogen atom. $R^{021}$ may be either monocyclic or polycyclic, and is usually an aliphatic nitrogen-containing ring.

The compound (1)-2B is a compound (1)-2 in which the hydrocarbon groups $R^{21}$ and $R^{22}$ are bonded to each other to form a ring.

In General Formula (1)-2C, $R^{022}$ represents a nitrogen-containing ring. That is, in General Formula (1)-2C, $R^{022}$ is a ring structure (nitrogen-containing cyclic group) that contains, as constituent atoms of the ring skeleton, one nitrogen atom to which none of $R^{021'}$ and $R^{024'}$ is bonded, among three nitrogen atoms described in the general formula. $R^{022}$ may be either monocyclic or polycyclic, and may be either an aliphatic nitrogen-containing ring or an aromatic nitrogen-containing ring.

The compound (1)-2C is a compound (1)-2 in which the hydrocarbon groups $R^{22}$ and $R^{23}$ are bonded to each other to form a ring.

In General Formula (1)-2D, $R^{023}$ is a nitrogen-containing ring. That is, in General Formula (1)-2D, $R^{023}$ is a ring structure (nitrogen-containing cyclic group) that contains, as constituent atoms of the ring skeleton: among three nitrogen atoms described in the general formula, two nitrogen atoms to which $R^{21'}$ is not bonded; and one carbon atom that is located between these nitrogen atoms. $R^{023}$ may be either monocyclic or polycyclic, and may be either an aliphatic nitrogen-containing ring or an aromatic nitrogen-containing ring.

The compound (1)-2D is a compound (1)-2 in which the hydrocarbon groups $R^{23}$ and $R^{24}$ are bonded to each other to form a ring.

In General Formula (1)-2E, each of $R^{021}$ and $R^{023}$ is a nitrogen-containing ring, $R^{021}$ is the same as $R^{021}$ in General Formula (1)-2B, and $R^{023}$ is the same as $R^{023}$ in General Formula (1)-2D.

The compound (1)-2E is a compound (1)-2 in which the hydrocarbon groups $R^{21}$ and $R^{22}$ are bonded to each other to form a ring, and the hydrocarbon groups $R^{23}$ and $R^{24}$ are bonded to each other to form a ring.

Preferred examples of the compound (1)-2A include a compound in which $R^{21'}$, $R^{22'}$, $R^{23'}$, and $R^{24'}$ are all alkyl groups or aryl groups.

Preferred examples of the compound (1)-2C include a compound in which $R^{022}$ is an aliphatic nitrogen-containing ring.

Preferred examples of the compound (1)-2D include a compound in which $R^{023}$ is an aliphatic nitrogen-containing ring.

Preferred example of the compound (1)-2E include a compound in which $R^{023}$ is an aliphatic nitrogen-containing ring (compound in which $R^{021}$ and $R^{023}$ are both aliphatic nitrogen-containing rings).

Preferred examples of the compound (1)-3 include a compound represented by the following General Formula (1)-3A (hereinafter, also referred to as "compound (1)-3A"), a compound represented by the following General Formula (1)-3B (hereinafter, also referred to as "compound (1)-3B"), a compound represented by the following General Formula (1)-3C (hereinafter, also referred to as "compound (1)-3C"), and a compound represented by the following General Formula (1)-3D (hereinafter, also referred to as "compound (1)-3D").

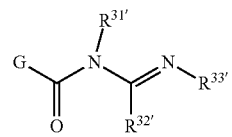

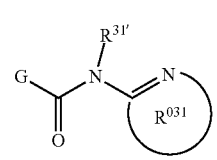

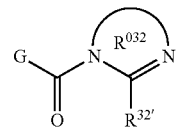

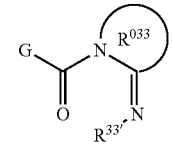

In General Formula (1)-3A to General Formula (1)-3D, each G is the same as that described above; each of $R^{31'}$, $R^{32'}$, and $R^{33'}$ independently represents a hydrogen atom or a hydrocarbon group; and each of $R^{031}$, $R^{032}$, and $R^{033}$ independently represents a nitrogen-containing ring.

In General Formula (1)-3A to General Formula (1)-3D, each of $R^{31'}$, $R^{32'}$, and $R^{33'}$ independently represents a hydrogen atom or a hydrocarbon group.

The hydrocarbon groups as $R^{31'}$, $R^{32'}$, and $R^{33'}$ are the same as those as $R^{11}$ to $R^{13}$, except that the hydrocarbon groups are not bonded to each other to form a ring.

Each of $R^{31'}$, $R^{32'}$, and $R^{33'}$ is preferably a hydrogen atom, an alkyl group, or an aryl group.

In General Formula (1)-3B, $R^{031}$ represents a nitrogen-containing ring.

That is, in General Formula (1)-3B, $R^{031}$ is a ring structure (nitrogen-containing cyclic group) that contains, as constituent atoms of the ring skeleton: among two nitrogen atoms described in the general formula, one nitrogen atom to which $R^{31'}$ is not bonded; and one carbon atom that is located between these two nitrogen atoms. $R^{031}$ may be either monocyclic or polycyclic, and may be either an aliphatic nitrogen-containing ring or an aromatic nitrogen-containing ring.

The compound (1)-3B is a compound (1)-3 in which the hydrocarbon groups $R^{32}$ and $R^{33}$ are bonded to each other to form a ring.

In General Formula (1)-3C, $R^{032}$ represents a nitrogen-containing ring.

That is, in General Formula (1)-3C, $R^{032}$ is a ring structure (nitrogen-containing cyclic group) that contains, as constituent atoms of the ring skeleton: two nitrogen atoms described in the general formula; and one carbon atom that is located between these two nitrogen atoms. $R^{032}$ may be either monocyclic or polycyclic, and may be either an aliphatic nitrogen-containing ring or an aromatic nitrogen-containing ring.

The compound (1)-3C is a compound (1)-3 in which the hydrocarbon groups $R^{31}$ and $R^{33}$ are bonded to each other to form a ring.

In General Formula (1)-3D, $R^{033}$ is a nitrogen-containing ring.

That is, in General Formula (1)-3D, $R^{033}$ is a ring structure (nitrogen-containing cyclic group) that contains, as constituent atoms of the ring skeleton: among three nitrogen atoms described in the general formula, one nitrogen atom to which $R^{33'}$ is not bonded; and one carbon atom that is located between these two nitrogen atoms. $R^{033}$ may be either monocyclic or polycyclic, and is usually an aliphatic nitrogen-containing ring.

The compound (1)-3D is a compound (1)-3 in which the hydrocarbon groups $R^{31}$ and $R^{32}$ are bonded to each other to form a ring.

Preferred examples of the compound (1)-3A include a compound in which at least one of $R^{31'}$, $R^{32'}$, or $R^{33'}$ is a hydrogen atom.

Preferred examples of the compound (1)-3B include a compound in which $R^{031}$ is an aliphatic nitrogen-containing ring.

Preferred examples of the compound (1)-3C include a compound in which $R^{032}$ is an aliphatic nitrogen-containing ring.

Preferred examples of the compound (1)-4 include a compound represented by the following General Formula (1)-4A (hereinafter, also referred to as "compound (1)-4A"), a compound represented by the following General Formula (1)-4B (hereinafter, also referred to as "compound (1)-4B"), a compound represented by the following General Formula (1)-4C (hereinafter, also referred to as "compound (1)-4C"), a compound represented by the following General Formula (1)-4D (hereinafter, also referred to as "compound (1)-4D"), and a compound represented by the following General Formula (1)-4E (hereinafter, also referred to as "compound (1)-4E").

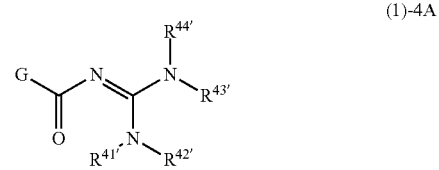

(1)-4A

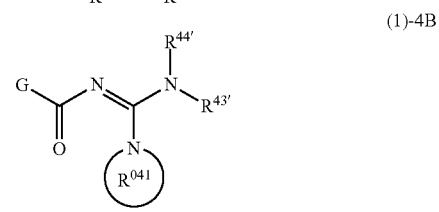

(1)-4B

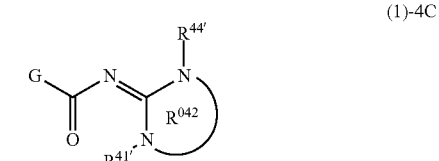

(1)-4C

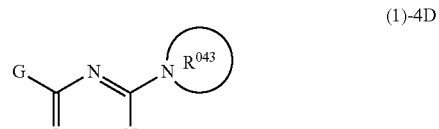

(1)-4D

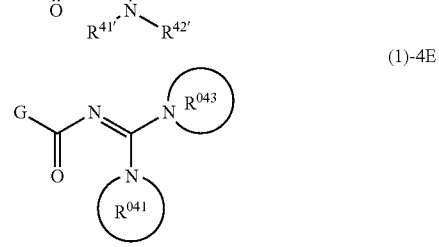

(1)-4E

In General Formula (1)-4A to General Formula (1)-4E, each G is the same as that described above; each of $R^{41'}$, $R^{42'}$, $R^{43'}$, and $R^{44'}$ independently represents a hydrogen atom or a hydrocarbon group; and each of $R^{041}$, $R^{042}$ and $R^{043}$ independently represents a nitrogen-containing ring.

In General Formula (1)-4A to General Formula (1)-4E, each of $R^{41'}$, $R^{42'}$, $R^{43'}$, and $R^{44'}$ independently represents a hydrogen atom or a hydrocarbon group.

The hydrocarbon groups as $R^{41'}$, $R^{42'}$, $R^{43'}$, and $R^{44'}$ are the same as those as $R^{11}$ to $R^{13}$, except that the hydrocarbon groups are not bonded to each other to form a ring.

In General Formula (1)-4A to General Formula (1)-4E, each of $R^{41'}$, $R^{42'}$, $R^{43'}$, and $R^{44'}$ is preferably a hydrogen atom, an alkyl group, or an aryl group, and more preferably an alkyl group or an aryl group.

Preferred examples of the compound (1)-4A include a compound in which $R^{41'}$, $R^{42'}$, $R^{43'}$, and $R^{44'}$ are all alkyl groups or aryl groups.

Preferred examples of the compound (1)-4B include a compound in which $R^{041}$ is an aliphatic nitrogen-containing ring.

Preferred examples of the compound (1)-4D include a compound in which $R^{043}$ is an aliphatic nitrogen-containing ring.

Preferred examples of the compound (1)-4E include a compound in which $R^{041}$ and $R^{043}$ are aliphatic nitrogen-containing rings.

Among the compounds represented by General Formula (1), the compound (1)-1A, the compound (1)-2E, the compound (1)-3A, and the compound (1)-4A are more preferable, and the compound (1)-2E is still more preferable.

Specific examples of the compound represented by General Formula (1) include the following compounds, but are not limited to the following compounds in the present disclosure.

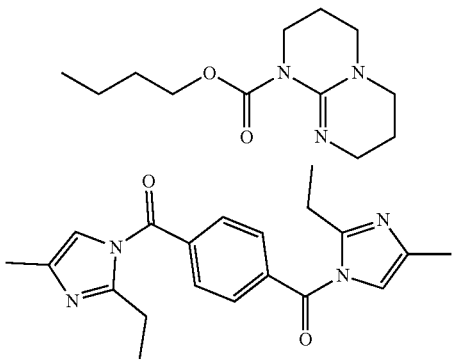

The compound represented by General Formula (1) can be produced using, for example, a known method for forming an ester structure or an amide structure.

The content of the base amplifier in the curable composition is preferably from 3% by mass to 15% by mass, and more preferably from 4% by mass to 12% by mass, and still more preferably from 5% by mass to 10% by mass, with respect to the total amount of the multivalent alcohol and the epoxy compound.

The content of the base amplifier being 3% by mass or more enables the content of a base generator to be reduced and is suitable for reducing the harmful effects of light absorption (that is, coloring) by the base generator itself. Further, there is an advantage that a base amplification action can be obtained more remarkably when used in combination with a base generator described later. Even if the base amplifier is contained at a content that exceeds 15% by mass, an effect commensurate with the content cannot be expected.

(Base Generator)

The curable composition of the present disclosure preferably includes at least one base generator (PBG: Photo Base Generator).

By containing a base generator, a base is generated when energy is applied.

As the base generator in the present disclosure, a compound that releases a strong base is preferable. As a result of a strong base being released, the urethane formation reaction between the polyvalent isocyanate compound and the multivalent alcohol can be promoted. Further, when used in combination with the base amplifier described above, the hydroxyl group of the multivalent alcohol and/or the epoxy group of the epoxy compound can be easily activated, for example, the generated base abstracts a proton from the multivalent alcohol. Then, the activation promotes the generation of a base from the base amplifier.

Since the base generation process in the composition progresses sequentially in such a manner, the urethane bond formation reaction easily progresses and the sensitivity of the curing reaction (anionic curing reaction) of the composition can be enhanced.

The base generator that releases a strong base can be appropriately selected from known compounds so-called base generators or photobase generators, and examples thereof, include oxime ester-based compounds, ammonium-based compounds, benzoin-based compound, dimethoxybenzyl urethane-based compounds, and orthonitrobenzyl urethane-based compounds.

The base generator is preferably a compound that generates a base in response to irradiation by light or heating. Among them, a compound that generates a base in response to irradiation by light is more preferable from the viewpoint of curing rate.

Examples of the base generator include a compound that generates a base in response to irradiation (exposure) by light having a wavelength of from 1 nm to 400 nm, and can include a nonionic photobase generator that generates a primary amine, a secondary amine, imidazole, or the like in response to irradiation by light and an ionic photobase generator that generates a tertiary amine or a strong base such as amidine or guanidine in response to irradiation by light.

Specific examples of the base generator include: the base generator represented by Formula (I) described in Japanese Patent No. 5401737; the base generator that is a carboxylate represented by Formula (X) described in Japanese Patent No. 5561694; the photobase generator represented by Formula (X) described in Japanese Patent No. 5725515; the base generator that is a carboxylic acid compound consisting of a carboxylic acid and a base described in Japanese Patent No. 5765851; the base generator that includes a compound represented by General Formula (A) described in Japanese Patent No. 6332870; and the base generator that consists of a carboxylate represented by Formula (X) described in Japanese Patent No. 6011956.

One example of the preferable base generators is shown below.

Preferred examples of the base generator include a carboxylate represented by the following formula.

$$A^- B^+ \quad \text{formula}$$

In the formula, $A^-$ is a carboxylic acid represented by any of the following Formulae (IV), (V), (VI), and (VII); and $B^+$ represents a base that consists of any of guanidines represented by the following Formula (I), Formula (I-c), Formula (I-d), Formula (I-e), Formula (I-f), Formula (I-g), or Formula (I-h), phosphazene derivatives represented by the following Formula (II), Formula (II-c), or Formula (II-d), and amidines represented by the following Formula (III).

Note that "Me" represents a methyl group, "Et" represents an ethyl group, "Pr" represents a propyl group, and "Bu" represents a butyl group.

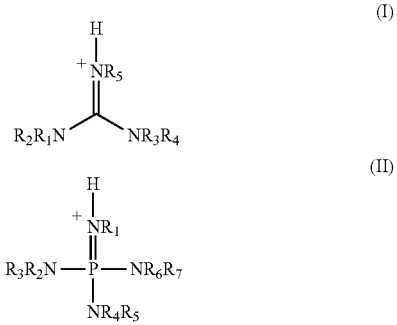

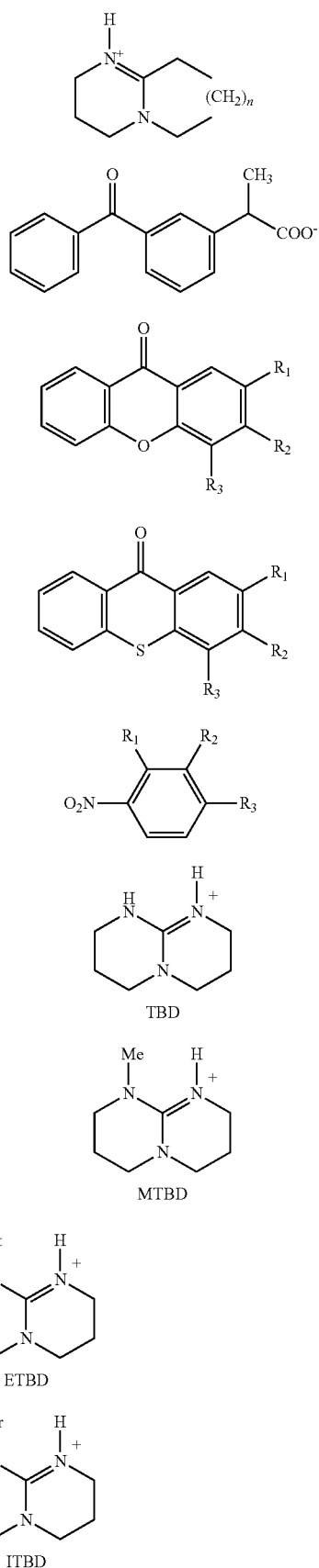
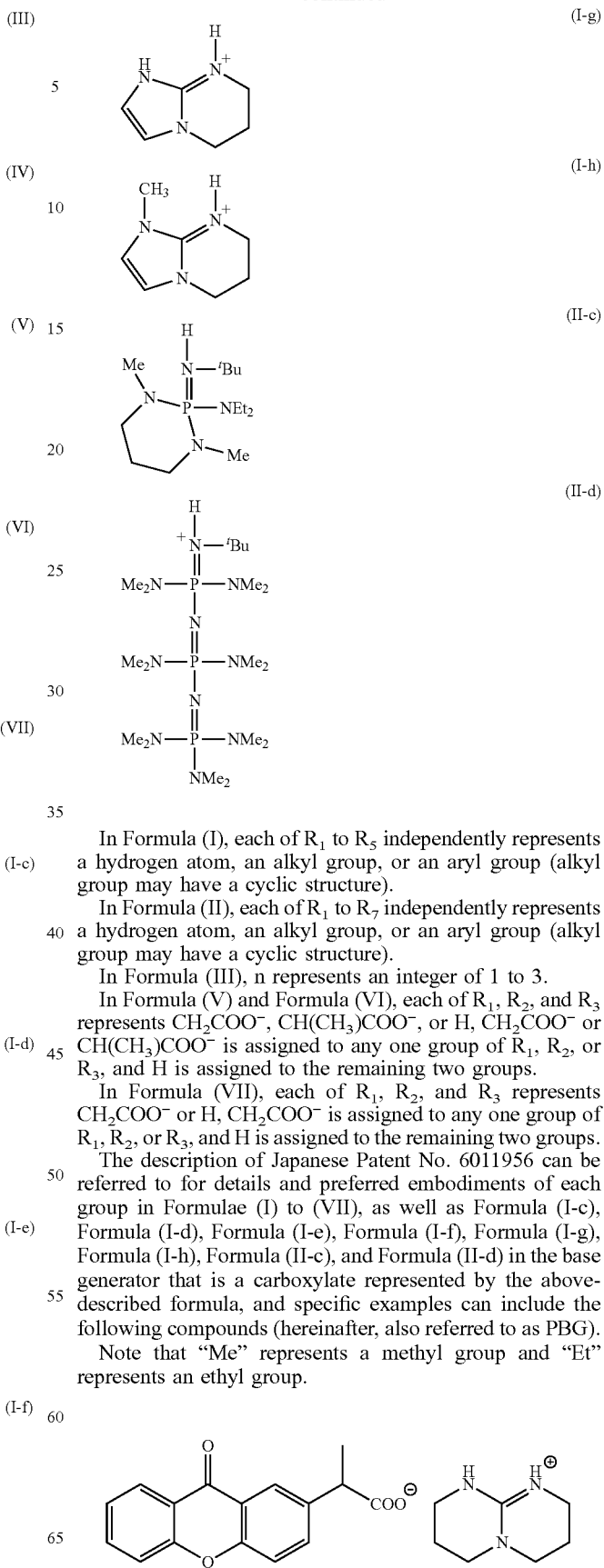

In Formula (I), each of $R_1$ to $R_5$ independently represents a hydrogen atom, an alkyl group, or an aryl group (alkyl group may have a cyclic structure).

In Formula (II), each of $R_1$ to $R_7$ independently represents a hydrogen atom, an alkyl group, or an aryl group (alkyl group may have a cyclic structure).

In Formula (III), n represents an integer of 1 to 3.

In Formula (V) and Formula (VI), each of $R_1$, $R_2$, and $R_3$ represents $CH_2COO^-$, $CH(CH_3)COO^-$, or H, $CH_2COO^-$ or $CH(CH_3)COO^-$ is assigned to any one group of $R_1$, $R_2$, or $R_3$, and H is assigned to the remaining two groups.

In Formula (VII), each of $R_1$, $R_2$, and $R_3$ represents $CH_2COO^-$ or H, $CH_2COO^-$ is assigned to any one group of $R_1$, $R_2$, or $R_3$, and H is assigned to the remaining two groups.

The description of Japanese Patent No. 6011956 can be referred to for details and preferred embodiments of each group in Formulae (I) to (VII), as well as Formula (I-c), Formula (I-d), Formula (I-e), Formula (I-f), Formula (I-g), Formula (I-h), Formula (II-c), and Formula (II-d) in the base generator that is a carboxylate represented by the above-described formula, and specific examples can include the following compounds (hereinafter, also referred to as PBG).

Note that "Me" represents a methyl group and "Et" represents an ethyl group.

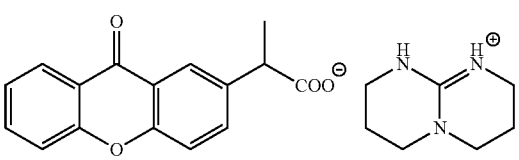

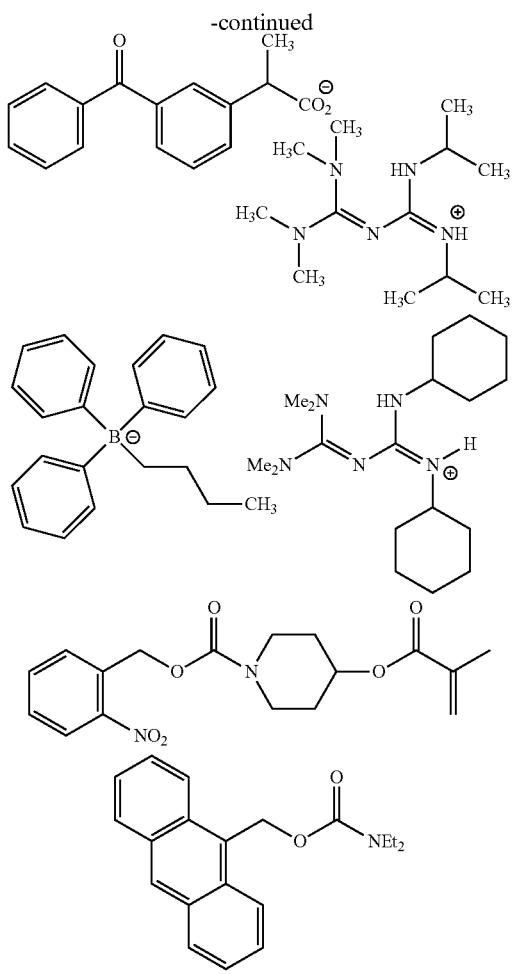

The content of the base generator in the curable composition is preferably from 4% by mass to 35% by mass, more preferably from 8% by mass to 30% by mass, and still more preferably from 12% by mass to 25% by mass, with respect to the total content of the multivalent alcohol and the epoxy compound.

When the content of the base generator is 4% by mass or more, the curing of the curable composition progresses more favorably. Further, when the content of the base generator is 35% by mass or less, the amount of the base generator does not become excessive and an effect commensurate with the content of the base generator can be expected.

(Other Components)

—Sensitizer—

The curable composition may include a sensitizer (photosensitizer) in addition to the base generator that generates a base in response to irradiation by light. This facilitates curing by irradiation by light having a wider wavelength range. For example, as a base generator that generates a base in response to irradiation by light, a base generator that generates a base in response to irradiation by ultraviolet rays (ultraviolet light) having a wavelength of from 1 nm to 400 nm is generally used. Therefore, by using a sensitizer in combination in the case of using such a base generator, the curable composition can be easily cured even by irradiation with visible light having a wavelength that is longer than that of ultraviolet rays. In this case, the sensitizer excited by absorbing visible light or the like acts on the base generator that generates a base in response to irradiation by light, by which a base is generated from the base generator as is the case with not using a sensitizer.

The sensitizer can be selected from those known such as benzophenone for use, and is not particularly limited.

The sensitizer included in the curable composition may be only one kind, or two or more kinds. When there are two or more kinds of sensitizers, the combination and ratio thereof can be set arbitrarily.

The content of the sensitizer in the curable composition is not particularly limited and may be appropriately adjusted.

—Filler—

The curable composition may include a filler (so-called filler), thereby characteristics such as viscosity of the curable composition and strength of the cured product can be adjusted.

The filler can be selected from those known for use, and is not particularly limited. The shape of the filler may be fibrous, plate-like, or granular, and each of the shape, the size, and the material may be appropriately selected depending on the intended purpose.

The filler included in the curable composition may be only one kind, or two or more kinds. When there are two or more kinds of fillers, the combination and ratio thereof can be set arbitrarily.

The content of the filler in the curable composition is not particularly limited and may be appropriately adjusted.

—Pigment—

The curable composition may include a pigment, thereby it is possible to adjust the color, light transmission, or the like of the cured product.

The pigment included in the curable composition is not particularly limited, can be appropriately selected from known pigments, and examples thereof include a pigment such as white, blue, red, yellow, and green.

The pigment included in the curable composition may be only one kind, or two or more kinds. When there are two or more kinds of pigments, the combination and ratio thereof can be set arbitrarily.

The content of the pigment in the curable composition is not particularly limited and may be appropriately adjusted.

—Solvent—

The curable composition may include a solvent, by which the handleability of the curable composition may be improved.

The solvent is not particularly limited, and may be appropriately selected taking into consideration solubility, stability, or the like of, for example, the polyfunctional isocyanate compound, the multivalent alcohol, the epoxy compound, the base amplifier, and the base generator.

Examples of the solvent include halogenated hydrocarbons such as dichloromethane and chloroform; aromatic hydrocarbons such as toluene, o-xylene, m-xylene, and p-xylene; aliphatic hydrocarbons such as hexane, heptane, and octane; carboxylate such as ethyl acetate and butyl acetate; ethers such as diethyl ether, tetrahydrofuran (THF), and 1,2-dimethoxyethane (dimethylcellosolve); ketones such as acetone, methylethylketone (MEK), cyclohexanone, and cyclopentanone; nitriles such as acetonitrile; and amides such as N,N-dimethylformamide (DMF) and N,N-dimethylacetamide.

The solvent included in the curable composition may be only one kind, or two or more kinds. When there are two or more kinds, the combination and ratio thereof can be arbitrarily set.

The content of the solvent in the curable composition is preferably from 20% by mass to 80% by mass, more preferably from 30% by mass to 75% by mass, and still more preferably from 40% by mass to 70% by mass, with respect to the total amount of the curable composition. When the content of the solvent is in the range above, the handleability of the curable composition can be further improved.

~Preparation of Curable Composition~

The curable composition can be prepared by formulating a polyfunctional isocyanate compound, a compound selected from the group consisting of a multivalent alcohol and an epoxy compound, a base amplifier and, if necessary, a base generator and other components. After formulating each component, the obtained product may be directly used as a curable composition, or may, if necessary, be continuously subjected to a known purification operation or the like, the resultant product from which is used as a curable composition.

When formulating each component, mixing may be carried out after adding all components, mixing may be carried out while sequentially adding some components, or mixing may be carried out while sequentially adding all components.

The mixing method is not particularly limited, and may be appropriately selected from known methods such as a method of mixing by rotating a stirrer or a stirring blade; a method of mixing using a mixer or the like; and a method of mixing by applying ultrasonic waves.

The temperature at the time of formulation is not particularly limited as long as each formulation component is not deteriorated, and can be set to, for example, from 3° C. to 30° C.

The formulation time is also not particularly limited as long as each formulation component is not deteriorated, and can be set to, for example, from 0.5 hour to 1 hour.

However, these formulating conditions are only an example.

<Cured Product>

The cured product of the present disclosure is obtained by curing the above-described curable composition of the present disclosure.

Since the curable composition of the present disclosure is excellent in the curing reactivity that progresses by applying energy, a cured product having a high curing degree can be obtained.

The shape of the cured product can be arbitrarily selected from, for example, a film shape or a linear shape depending on the purpose.

The curable composition of the present disclosure includes a base amplifier, or a base amplifier and a base generator, by which the curing reaction by a base can easily progress sequentially and extensively, and the reaction sensitivity can be increased than ever before.

Therefore, the thickness of the cured product can be increased and can be set to, for example, $0.5 \times 10^{-3}$ m (=500 μm) or more. Further, the thickness of the cured product may be set to $1 \times 10^{-3}$ m (1 mm) or more, and can also be set to $1 \times 10^{-2}$ m (10 mm) or more.

<Method of Producing Cured Product>

The method of producing a cured product of the present disclosure includes a step of forming a urethane bond using, as a catalyst, a base that is generated by applying energy to the above-described curable composition of the present disclosure. The method of producing a cured product of the present disclosure may further include other steps.

Here, the energy includes active energy rays, heat, or the like, and is preferably active energy rays. The active energy rays include X-rays, ultraviolet rays, visible rays, or the like.

The application of energy is preferably at least one of irradiation by light or heating, and more preferably irradiation by light.

In the method of producing a cured product of the present disclosure, as described later, a urethane bond formation reaction progresses by the action of a base generated in the composition, and a base that contributes to the urethane bond formation reaction is generated efficiently and sequentially by a base amplifier. That is, the generated base acts on the multivalent alcohol and/or the epoxy compound, to promote generation of a base from the base amplifier. As a result, the urethane bond formation reaction can be promoted, and a polyurethane that is a reacted cured product can be produced with favorable sensitivity.

Further, in the case in which the curable composition of the present disclosure includes a base generator, the step of forming a urethane bond described above generates a base from the base generator and generates a base from the base amplifier by applying energy to the curable composition. A part of the base present in the composition provides activation of a hydroxyl group of the multivalent alcohol or activation of an epoxy group of the epoxy compound (for example, formation of a hydroxyl group having an active hydrogen), to promote generation of a base from the base amplifier. Further, another part of the base present in the composition, as a catalyst, initiates or promotes a urethane bond formation reaction of the polyvalent isocyanate compound and the multivalent alcohol, to efficiently produce a polyurethane that is a reacted cured product.

Here, it is presumed that each component acts as shown in Scheme 1 below, by which the reaction progresses. The reaction system will be specifically described with reference to Scheme 1 below.

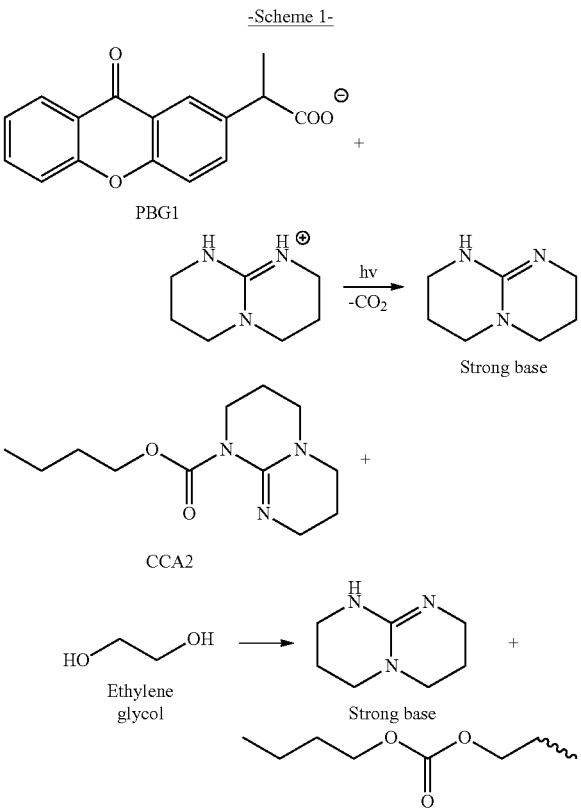

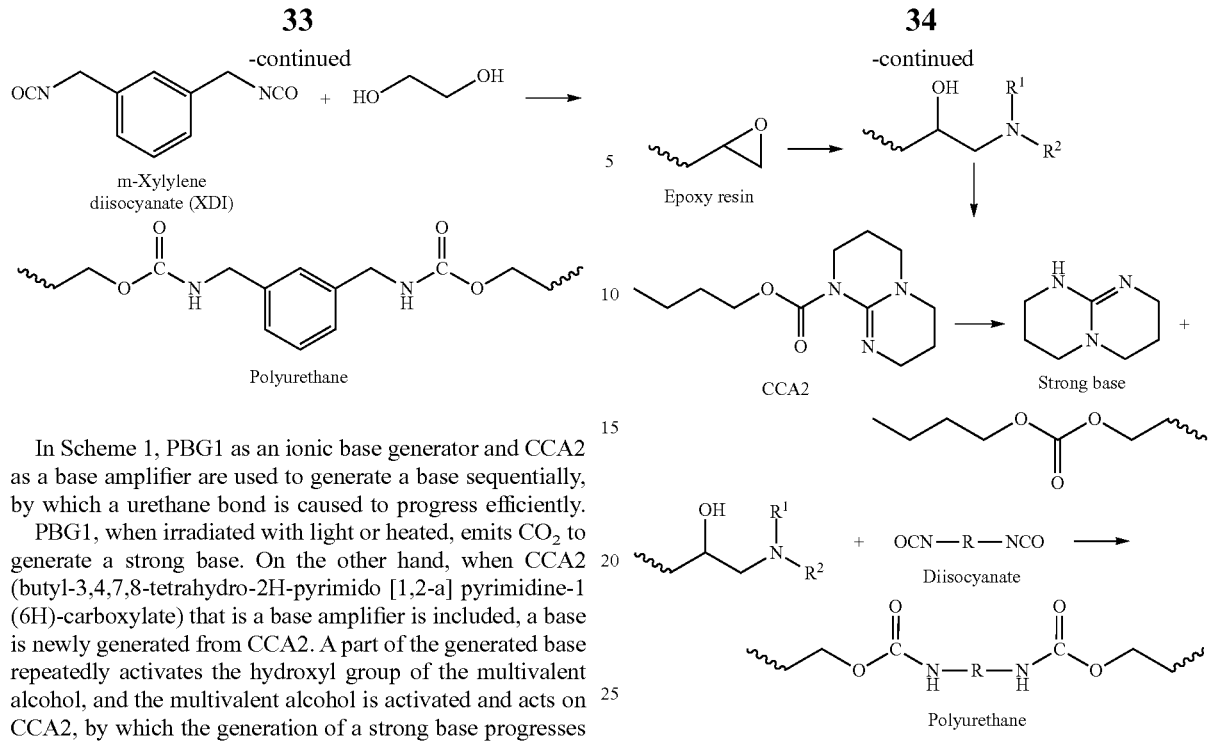

In Scheme 1, PBG1 as an ionic base generator and CCA2 as a base amplifier are used to generate a base sequentially, by which a urethane bond is caused to progress efficiently.

PBG1, when irradiated with light or heated, emits $CO_2$ to generate a strong base. On the other hand, when CCA2 (butyl-3,4,7,8-tetrahydro-2H-pyrimido [1,2-a] pyrimidine-1 (6H)-carboxylate) that is a base amplifier is included, a base is newly generated from CCA2. A part of the generated base repeatedly activates the hydroxyl group of the multivalent alcohol, and the multivalent alcohol is activated and acts on CCA2, by which the generation of a strong base progresses sequentially. As such, a base (particularly, strong base) is sequentially generated in the composition, and a part of the generated base serves as a catalyst in the urethane bond formation reaction between the polyisocyanate compound and the multivalent alcohol. As a result, the urethane formation reaction progresses more rapidly (that is, with favorable sensitivity), and a polyurethane that is a reacted cured product is produced.

Therefore, the curability (urethane formation reactivity) in a case of forming the curable composition into, for example, a thick film (for example, with a thickness of $0.5 \times 10^{-3}$ or more) having deeper portions that irradiated light cannot reach, is improved, and the urethane formation reaction is caused to rapidly progress into the deepest portions of the film.

In Scheme 1 above, an example using ethylene glycol is shown; however, the same applies to the case of using diglycerol or the like as the multivalent alcohol, and the urethane bond formation reaction is caused to progress efficiently.

Further, in Scheme 1 above, PBG1 is shown as an example as the base generator; however, since a base amplifier is used in the present disclosure, it is also possible to cause the urethane bond formation reaction to progress efficiently based on a similar reaction scheme even when using another base generator.

Next, an embodiment of using an epoxy compound instead of the multivalent alcohol to produce a urethane resin as a solvent-free curable composition is shown below.

-Scheme 2-

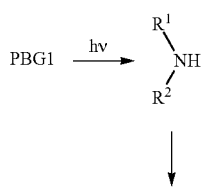

In Scheme 2, it is presumed that each component acts as shown in the scheme above.

Scheme 2 shows a reaction pathway in which PBG1 as an ionic base generator and CCA2 as a base amplifier are used to generate a base sequentially and an epoxy compound is used instead of the multivalent alcohol, which causes a urethane bond formation reaction to progress efficiently.

In this scheme, since an epoxy compound is used without using the multivalent alcohol that easily reacts with the base amplifier, a reaction caused by the multivalent alcohol can be avoided; therefore, the stability of the composition itself can be improved and the pot life of the composition can be further improved.

In Scheme 2, PBG1 generates a base represented by $R^1NHR^2$ in response to irradiation by light or heating, as is the case with the above. The generated base acts on the epoxy resin as an epoxy compound to generate a hydroxyl group from the epoxy group, and acts on CCA2 as a base amplifier to decompose CCA2 to newly generate a strong base, and is bonded to the residue of CCA2. The newly generated strong base acts on the reaction between the amine compound having a hydroxyl group and the diisocyanate compound. Then, a part of the generated base acts on the epoxy resin to activate the epoxy group one after another (formation of a hydroxyl group with an active hydrogen) to generate a strong base sequentially. As such, a base (particularly, strong base) is sequentially generated, and a part of the generated base serves as a catalyst in the urethane bond formation reaction between the amine compound having a hydroxyl group and the polyisocyanate compound.

As a result, the urethane formation reaction progresses more rapidly (that is, with favorable sensitivity), and a polyurethane that is a reacted cured product is produced.

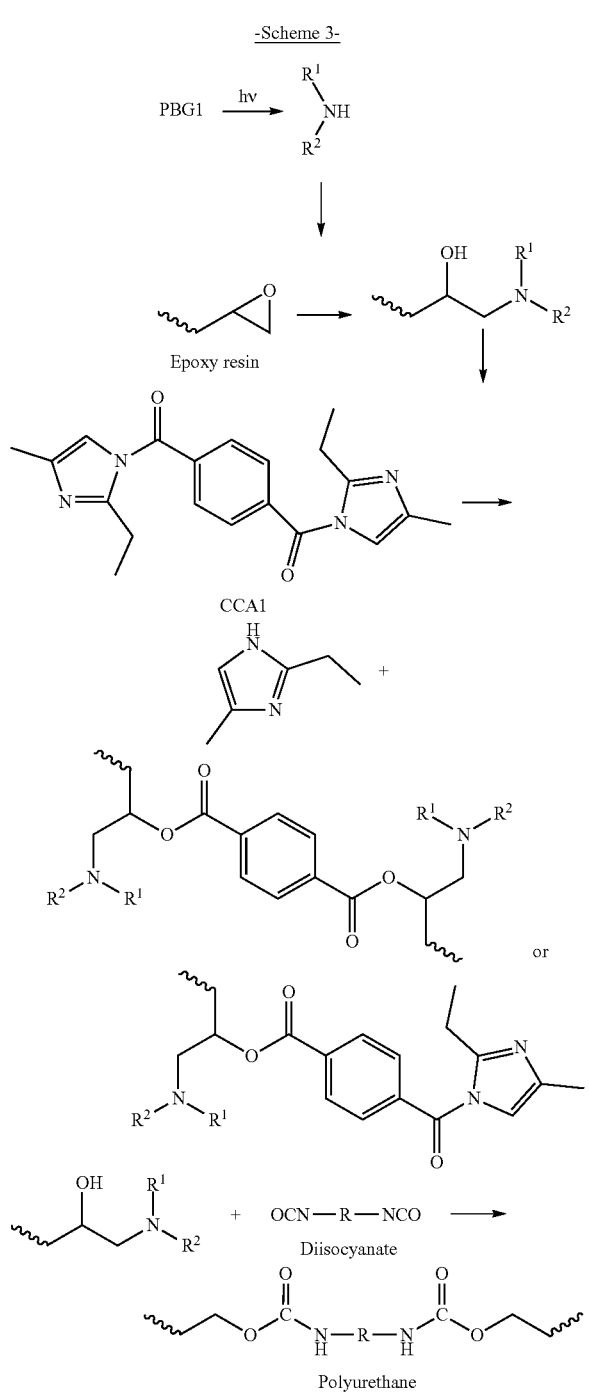

Scheme 3

In Scheme 3, PBG1 as an ionic base generator and CCA1 as a base amplifier are used to generate a base sequentially, and it is presumed that each component acts as shown in Scheme 3.

In Scheme 3, PBG1 generates a base represented by $R^1NHR^2$ in response to irradiation by light or heating, as is the case with the above. The generated base acts on the epoxy resin as an epoxy compound to generate a hydroxyl group from the epoxy group, and acts on CCA1 as a base amplifier to decompose CCA1 to newly generate an imidazole compound as a base. The generated base is bonded to a part or all of the residue of CCA1. Further, the generated base acts on the epoxy resin to newly generate a base, and this base acts on the reaction between the amine compound having a hydroxyl group and the diisocyanate compound. Then, a part of the generated base acts on the epoxy resin again to activate the epoxy group one after another (formation of a hydroxyl group with an active hydrogen) to generate a base sequentially. As such, a base (particularly, a strong base) is sequentially generated in the composition, and a part of the generated base serves as a catalyst in the urethane bond formation reaction between the epoxy resin or the amine compound having a hydroxyl group and the polyisocyanate compound.

As a result, the urethane formation reaction progresses more rapidly (that is, with favorable sensitivity), and a polyurethane that is a reacted cured product is produced.

In Schemes 2 and 3 above, an example using PBG1 as a base generator is shown; however, since a base amplifier is used in the present disclosure, it is also possible to cause the urethane bond formation reaction to progress efficiently based on a similar reaction scheme even when using another base generator.

As an embodiment of the curable composition to which energy is applied, it is preferably configured as a film having a thickness of $0.5 \times 10^{-3}$ (=500 μm) or more. Further, the thickness may be $1 \times 10^{-3}$ m (1 mm) or more, or may be $1 \times 10^{-2}$ m (10 mm) or more.

For example, the curable composition is adhered to a target adherend by a known method, prebaked (dried) as necessary, and then cured by irradiation with light or heating, by which a cured product is obtained.

In the case of, for example, producing a film-like cured product (that is, cured film), the target cured product can be obtained by coating the curable composition to a target adherend using coating means such as various coaters such as an air knife coater, a blade coater, a bar coater, a gravure coater, a roll coater, a roll knife coater, a curtain coater, a die coater, a knife coater, a screen coater, a mayer bar coater, and a kiss coater, or various applicators, or by immersing a target adherend in the curable composition. Further, the target cured product can also be obtained by, for example, using means such as a screen printing method, a flexo printing method, an offset printing method, an inkjet method, a dispenser printing method, a jet dispenser printing method, a gravure printing method, a gravure offset printing method, and a pad printing method.

The prebake is not particularly limited in terms of conditions, and can be performed, for example, under the conditions of from 50° C. to 80° C. for 1 minute to 10 minutes.

In the case of irradiating the curable composition with light to produce a cured product, the wavelength of light at the time of light irradiation of the curable composition is preferably, for example, from 200 nm to 500 nm.

The illuminance of light at the time of light irradiation is preferably, for example, from 30 mW/cm² to 100 mW/cm², and the dose of light is preferably, for example, from 800 mJ/cm² to 8,000 mJ/cm².

The cured product obtained by light irradiation of the curable composition may be further post-baked (heat treatment after exposure). The post-baking can be performed under the conditions of, for example, from 100° C. to 160° C. for 0.5 hours to 2 hours, but the conditions are not limited thereto.

In the case of heating the curable composition to produce a cured product, the heating temperature of the curable composition is preferably, for example, from 80° C. to 160°

C. The heating time during heating is preferably, for example, from 0.5 hours to 2 hours.

EXAMPLES

Hereinafter, the present disclosure will be more specifically described with reference to examples. However, the present disclosure is not limited to the following examples as long as not departing from the spirit thereof. Unless otherwise specified, "parts" are in terms of mass.

Example 1

0.26 g ($1.4 \times 10^{-3}$ mol) of m-xylylene diisocyanate (XDI; bifunctional polyisocyanate), 0.12 g ($7.2 \times 10^{-4}$ mol) of diglycerol (polyol), and 0.80 g (6.7 times mol with respect to polyol) of dimethyl sulfoxide (DMSO) were formulated, and mixed by applying ultrasonic waves.

To the obtained mixture, $4.8 \times 10^{-3}$ g (4% by mass with respect to diglycerol) of PBG (base generator) represented by the following structure was then added, and $8.4 \times 10^{-3}$ g (7% by mass with respect to diglycerol) of CCA2 (base amplifier) that is a compound represented by the following structure was added, and stirred and mixed again by applying ultrasonic waves to prepare a curable composition.

Next, the curable composition prepared as described above was placed in a glass tube having a diameter φ of 8 mm and a length of 30 mm to prepare a columnar test sample 1. Further, a glass substrate having a length of 10 mm and a width of 20 mm was immersed in the curable composition prepared as described above, by which a curable layer having a thickness of from 2 mm to 3 mm was formed on the glass substrate to prepare a plate-like test sample 2.

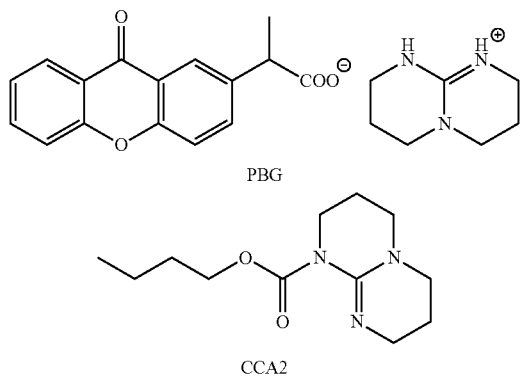

Comparative Example 1

A columnar test sample 3 was prepared in the same manner as Example 1, except that the compound CCA2 (base amplifier) was not used in Example 1.

(Curability Evaluation 1)

(1) The prepared test samples 1 to 3 were irradiated with light under the following irradiation conditions and curability thereof were evaluated. At this time, in each curable composition, the polyisocyanate and the polyol were reacted to produce a polyurethane that is a cured product.

<Irradiation Conditions>

Exposure wavelength: 365 nm

Illuminance: 50 mW/cm$^2$

Dose: 4,000 mJ/cm$^2$

Figure 2:
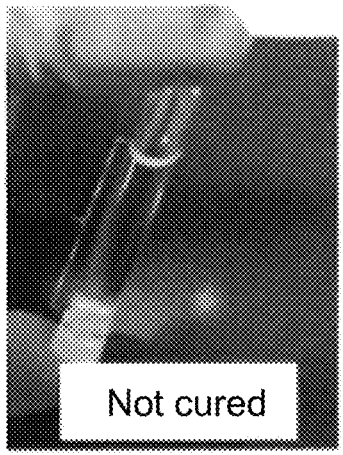
FIG. 2 is an image showing a result of the evaluation test of curability of Comparative Example 1.
Figure 2:

As a result, as shown in FIGS. 1 and 2, the test samples 1 and 2 were favorably cured by irradiation. On the other hand, the test sample 3 for comparison that did not use a base amplifier could not exhibit sufficient curability even when light irradiation was performed, as is the case with no irradiation.

As is clear from the test samples 1 and 2, the curable composition of the present disclosure exhibits favorable curability even in a shape of being thick.

(2) Next, the progressivity of curing was evaluated by the following manner.

A test sample 1a and a test sample 3a were prepared in the same manner as the test sample 1 (Example 1) and the test sample 3 (comparative example 1), except that PBG (base generator) was not used in the preparation of these samples, respectively.

Then, each test sample was applied to a glass substrate of 13 mm×76 mm, and a drop of 1,5,7-triazabiciclo[4.4.0]dec-5-ene (TBD) was dropped, as a base, onto one end of each glass substrate in a longitudinal direction. The temperature change in the coating film at this time was evaluated by using a thermo-sensor and observing a thermographic image.

As a result, the temperature increase was observed in either glass substrate until the vicinity of the center of the substrate in the longitudinal direction; however, while the temperature rise (maximum value) in the test sample 3a was 65.2° C., the temperature rise (maximum value) in the test sample 1a was 54.9° C. That is, although there was no difference in the diffusion of the base within the film, it is probable that inclusion of a base amplifier causes sequential curing, as a result of which the difference in temperature between the two samples appears.

As such, decrease in the addition amount of a base generator can be expected and a significant temperature rise can be avoided; therefore, it is considered to be suitable for use of a heat-sensitive substrate or the like.

Reference Example

A 40% by mass tetrahydrofuran solution of the PBG polymer represented by the following structure (weight average molecular weight (Mw): 5,440, molecular weight distribution (Mw/Mn): 1.47, n=14.7) as a base generator was prepared.

Then, 1 g of bisphenol A type epoxy resin (Mitsubishi Chemical Co., Ltd., jER828; epoxy compound), 0.025 g of the compound CCA1 (base amplifier) represented by the following structure (2.5% by mass with respect to the epoxy resin), and 1.5 g of chloroform (150% by mass with respect to the epoxy resin) were added and mixed by applying ultrasonic waves to prepare a curable composition a.

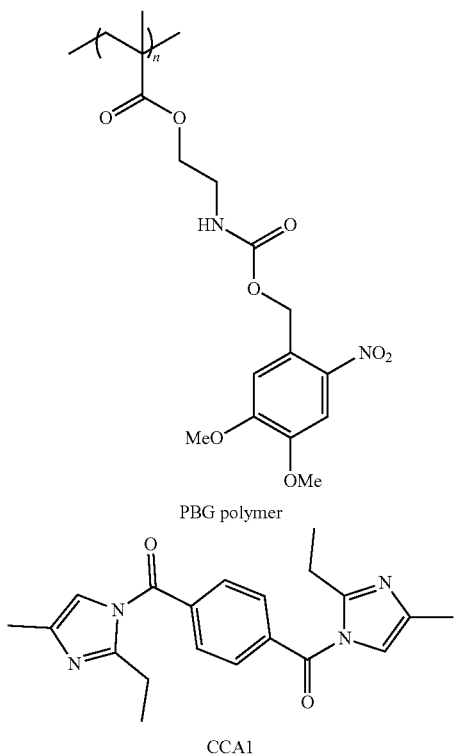

PBG polymer

CCA1

Then, a 40% by mass tetrahydrofuran solution of the PBG polymer was applied by a spin coater onto a silicon substrate and prebaked at 60° C., and then subjected to light irradiation (wavelength: 365 nm, dose: 28,000 mJ/cm$^2$), by which a first substrate that has a PBG layer with a thickness of from about 1 to about 2 μm was prepared. Further, another silicon substrate was prepared and the curable composition a was dropped onto the silicon substrate, and then prebaked at 60° C., by which a second substrate that has, on the silicon substrate, a CCA layer with a thickness of from 10 μm to 13 μm was prepared.

The prepared first substrate and second substrate were layered such that the PBG layer and the CCA layer came into contact with each other, to obtain a layered body. Then, the obtained layered body was heated in an oven at 125° C. to allow a curing reaction.

(Curability Evaluation 2)

The heated layered body prepared in the reference example was subjected to measurement using Fourier transform infrared spectroscopy (FT-IR).

Figure 3:
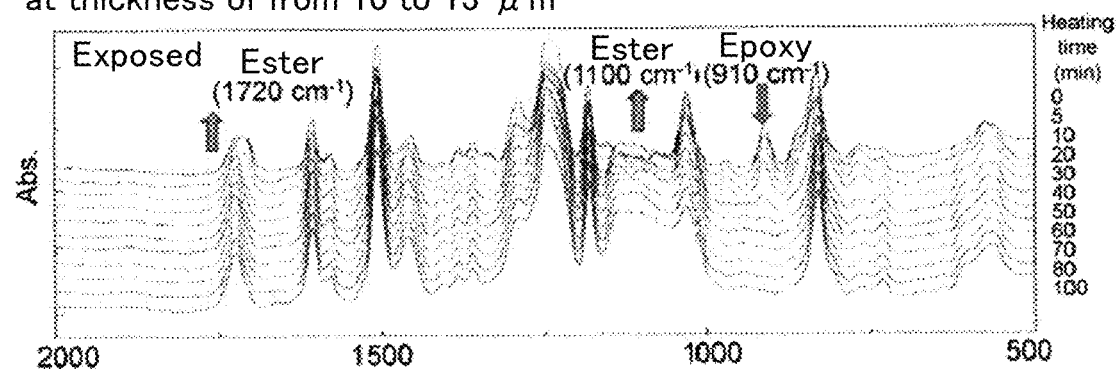
FIG. 3 is a measurement result of the FT-IR spectrum in Reference Example.

As a result, as shown in FIG. 3, it was confirmed that a peak in the vicinity of 910 cm$^{-1}$, which is attributed to the epoxy group, was decreased due to heating in the layered body of the reference example in which the thickness of the CCA layer was from 10 μm to 13 μm.

On the other hand, it was found that the layered body of the reference example exhibited a smaller increase of a peak in the vicinity of 1,720 cm$^{-1}$, which is attributed to the ester group, than the layered body for comparison. That is, it is presumed that the inclusion of a base amplifier caused the reaction due to the generation of the base from the base amplifier to predominantly progress, while suppressing the generation of carbonic acid caused by the base generator. That is, it was confirmed that it was due to the reaction mechanism of the base amplifier.

Therefore, it is considered that, even when formed into a thick film, the curing reaction progresses favorably and the manufacturability of the cured product is favorable.

The disclosure of Japanese Patent Application No. 2018-159767, filed Aug. 28, 2018, is incorporated herein by reference in its entirety.

All publications, patent applications, and technical standards mentioned in the present specification are herein incorporated by reference to the same extent as if each individual publication, patent application, or technical standard was specifically and individually indicated to be incorporated by reference.

What is claimed is:

1. A curable composition, comprising:
   a polyfunctional isocyanate compound;
   a compound selected from the group consisting of a multivalent alcohol and an epoxy compound;
   a base amplifier; and
   a base generator,
   wherein a content of the base amplifier in the curable composition is from 3% by mass to 15% by mass with respect to a total amount of the multivalent alcohol and the epoxy compound.

2. The curable composition according to claim 1, wherein the base amplifier comprises a compound represented by the following General Formula (1):

wherein, in the formula, G represents an organic group; and X is a group represented by the following General Formula (1)-11, General Formula (1)-12, General Formula (1)-13, or General Formula (1)-14:

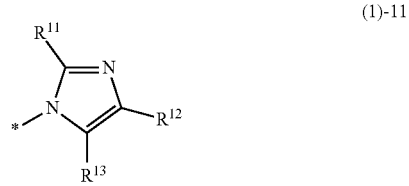

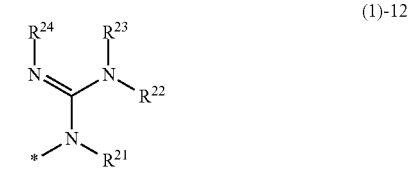

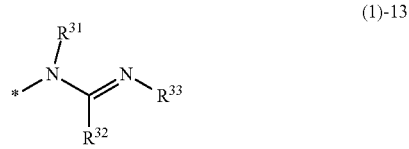

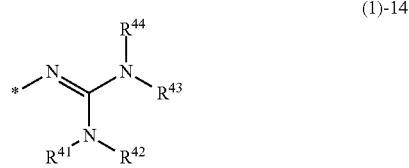

wherein, in the formulae, each of $R^{11}$, $R^{12}$, $R^{13}$, $R^{21}$, $R^{22}$, $R^{23}$, $R^{24}$, $R^{31}$, $R^{32}$, $R^{33}$, $R^{41}$, $R^{42}$, $R^{43}$, and $R^{44}$ independently represents a hydrogen atom or a hydrocarbon group; when two or more of $R^{11}$, $R^{12}$, or $R^{13}$ are hydrocarbon groups, the two or more hydrocarbon groups may be bonded to each other to form a ring; when two or more of $R^{21}$, $R^{22}$, $R^{23}$, or $R^{24}$ are hydrocarbon groups, the two or more hydrocarbon groups may be bonded to each other to form a ring; when two or more of $R^{31}$, $R^{32}$, or $R^{33}$ are hydrocarbon groups, the two or more hydrocarbon groups may be bonded to each other to form a ring; when two or more of $R^{41}$, $R^{42}$, $R^{43}$, or $R^{44}$ are hydrocarbon groups, the two or more hydrocarbon groups may be bonded to each other to form a ring; and * represents a site that is bonded to a carbon atom.

3. The curable composition according to claim 2, wherein the compound represented by General Formula (1) comprises at least one compound selected from the group consisting of a compound represented by the following General Formula (1)-A and a compound represented by the following General Formula (1)-B:

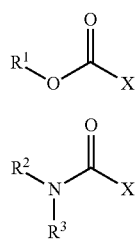

wherein, in the formulae, $R^1$ represents an organic group; each of $R^2$ and $R^3$ independently represents a hydrogen atom or an organic group; each X independently represents the group represented by General Formula (1)-11, General Formula (1)-12, General Formula (1)-13, or General Formula (1)-14; at least one of $R^2$ or $R^3$ represents an organic group; and when $R^2$ and $R^3$ are both organic groups, they may be bonded to each other to form a ring.

4. The curable composition according to claim 1, wherein the base generator is a compound that generates a base in response to irradiation by light or heating.

5. A cured product obtained by curing the curable composition according to claim 1.

6. The cured product according to claim 5, having a thickness of $1 \times 10^{-3}$ m or more.

7. A method of producing a cured product, the method comprising:
forming a urethane bond using, as a catalyst, a base that is generated by applying energy to the curable composition according to claim 1.

8. A method of producing a cured product, the method comprising:
applying energy to the curable composition according to claim 1, to generate a base from the base generator and to generate a base from the base amplifier;
wherein a part of the generated base activates a hydroxyl group of the multivalent alcohol or an epoxy group of the epoxy compound, to promote generation of a base from the base amplifier, and another part of the generated base, as a catalyst, initiates or promotes a urethane bond formation reaction of the polyvalent isocyanate compound and the multivalent alcohol, to produce a polyurethane that is a reacted cured product.

9. The method of producing a cured product according to claim 7, wherein the application of energy is at least one of irradiation by light or heating.

10. The method of producing a cured product according to claim 7, wherein the curable composition is a film having a thickness of $1 \times 10^{-3}$ or more.

* * * * *